(12) United States Patent
Phan

(10) Patent No.: US 12,169,889 B2
(45) Date of Patent: Dec. 17, 2024

(54) ENHANCED SYSTEM FOR GENERATION OF FACIAL MODELS AND ANIMATION

(71) Applicant: Electronic Arts Inc., Redwood City, CA (US)

(72) Inventor: Hau Nghiep Phan, Montreal (CA)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 17/344,618

(22) Filed: Jun. 10, 2021

(65) Prior Publication Data

US 2022/0398797 A1 Dec. 15, 2022

(51) Int. Cl.
*G06T 13/40* (2011.01)
*G06N 3/08* (2023.01)
*G06T 17/20* (2006.01)
*G06V 20/40* (2022.01)
*G06V 40/16* (2022.01)

(52) U.S. Cl.
CPC .......... *G06T 13/40* (2013.01); *G06N 3/08* (2013.01); *G06T 17/20* (2013.01); *G06V 20/46* (2022.01); *G06V 40/168* (2022.01); *G06V 40/174* (2022.01)

(58) Field of Classification Search
CPC ......... G06T 13/40; G06T 19/00; G06T 19/20; G06V 40/16; G06V 40/174; G06V 40/175; G06V 40/176
See application file for complete search history.

(56) References Cited

U.S. PATENT DOCUMENTS

| | | | |
|---|---|---|---|
| 5,274,801 A | 12/1993 | Gordon | |
| 5,548,798 A | 8/1996 | King | |
| 5,982,389 A | 11/1999 | Guenter et al. | |
| 5,999,195 A | 12/1999 | Santangeli | |
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |
| 7,006,090 B2 | 2/2006 | Mittring | |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Olszewski, Kyle, et al. "Realistic dynamic facial textures from a single image using gans." Proceedings of the IEEE International Conference on Computer Vision. 2017. (Year: 2017).*

(Continued)

*Primary Examiner* — Ryan McCulley
(74) *Attorney, Agent, or Firm* — Knobbe, Martens, Olson & Bear, LLP

(57) ABSTRACT

Systems and methods are provided for enhanced animation generation based on generative modeling. An example method includes training models based on faces and information associated with persons, each face being defined based on location information associated with facial features, and identity information for each person. The modeling system being trained to reconstruct expressions, textures, and models of persons.

17 Claims, 17 Drawing Sheets

(56) References Cited

U.S. PATENT DOCUMENTS

| | | |
|---|---|---|
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,067,097 B2 | 6/2015 | Lane et al. |
| 9,098,766 B2 | 8/2015 | Dariush et al. |
| 9,117,134 B1 | 8/2015 | Geiss et al. |
| 9,177,409 B2 | 11/2015 | Rennuit et al. |
| 9,208,613 B2 | 12/2015 | Mukai |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,827,496 B1 | 11/2017 | Zinno |
| 9,858,700 B2 | 1/2018 | Rose et al. |
| 9,928,663 B2 | 3/2018 | Eisemann et al. |
| 9,947,123 B1 | 4/2018 | Green |
| 9,984,658 B2 | 5/2018 | Bonnier et al. |
| 9,987,749 B2 | 6/2018 | Nagendran et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,163,001 B2 | 12/2018 | Kim et al. |
| 10,198,845 B1 | 2/2019 | Bhat et al. |
| 10,297,066 B2 | 5/2019 | Brewster |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,565,731 B1 | 2/2020 | Reddy et al. |
| 10,726,611 B1 | 7/2020 | Court |
| 10,733,765 B2 | 8/2020 | Andreev |
| 10,755,466 B2 | 8/2020 | Chamdani et al. |
| 10,783,690 B2 | 9/2020 | Sagar et al. |
| 10,792,566 B1 | 10/2020 | Schmid |
| 10,810,780 B2 | 10/2020 | Hutchinson et al. |
| 10,818,065 B1 | 10/2020 | Saito et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 11,017,560 B1 | 5/2021 | Gafni et al. |
| 11,062,494 B2 | 7/2021 | Orvalho et al. |
| 11,113,860 B2 | 9/2021 | Rigiroli et al. |
| 11,217,003 B2 | 1/2022 | Akhoundi et al. |
| 11,232,621 B2 | 1/2022 | Akhoundi et al. |
| 11,295,479 B2 | 4/2022 | Andreev |
| 11,504,625 B2 | 11/2022 | Stevens |
| 11,648,480 B2 | 5/2023 | Akhoundi |
| 11,798,176 B2 | 10/2023 | Payne et al. |
| 11,836,843 B2 | 12/2023 | Akhoundi et al. |
| 11,992,768 B2 | 5/2024 | Akhoundi et al. |
| 2002/0013172 A1 | 1/2002 | Kaku et al. |
| 2002/0054054 A1 | 5/2002 | Sanbe |
| 2002/0089504 A1 | 7/2002 | Merrick et al. |
| 2002/0140696 A1 | 10/2002 | Futamura et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0104912 A1 | 6/2004 | Yamamoto et al. |
| 2004/0138959 A1 | 7/2004 | Hlavac et al. |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0061574 A1 | 3/2006 | Ng-Thow-Hing et al. |
| 2006/0149516 A1 | 7/2006 | Bond et al. |
| 2006/0217945 A1 | 9/2006 | Leprevost |
| 2006/0250526 A1 | 11/2006 | Wang et al. |
| 2006/0262113 A1 | 11/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0267465 A1 | 10/2010 | Ceminchuk |
| 2010/0277497 A1 | 11/2010 | Dong et al. |
| 2010/0302257 A1 | 12/2010 | Perez et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0221755 A1 | 9/2011 | Geisner et al. |
| 2011/0269540 A1 | 11/2011 | Gillo et al. |
| 2011/0292055 A1 | 12/2011 | Hodgins et al. |
| 2011/0319164 A1 | 12/2011 | Matsushita et al. |
| 2012/0028706 A1 | 2/2012 | Raitt et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0310610 A1 | 12/2012 | Ito et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0271458 A1 | 10/2013 | Andriluka et al. |
| 2013/0293538 A1 | 11/2013 | Mukai |
| 2013/0311885 A1 | 11/2013 | Wang et al. |
| 2014/0002463 A1 | 1/2014 | Kautzman et al. |
| 2014/0035929 A1 | 2/2014 | Matthews et al. |
| 2014/0035933 A1 | 2/2014 | Saotome |
| 2014/0066196 A1 | 3/2014 | Crenshaw |
| 2014/0198106 A1 | 7/2014 | Sumner et al. |
| 2014/0198107 A1 | 7/2014 | Thomaszewski et al. |
| 2014/0267312 A1 | 9/2014 | Powell |
| 2014/0327694 A1 | 11/2014 | Cao et al. |
| 2014/0340644 A1 | 11/2014 | Haine et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0221131 A1 | 8/2015 | Luo et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0078662 A1 | 3/2016 | Herman et al. |
| 2016/0217723 A1 | 7/2016 | Kim et al. |
| 2016/0220903 A1 | 8/2016 | Miller et al. |

(56) References Cited

U.S. PATENT DOCUMENTS

| | | | |
|---|---|---|---|
| 2016/0307369 A1 | 10/2016 | Freedman et al. | |
| 2016/0314617 A1 | 10/2016 | Forster et al. | |
| 2016/0353987 A1 | 12/2016 | Carrafa et al. | |
| 2016/0354693 A1 | 12/2016 | Yan et al. | |
| 2017/0090577 A1 | 3/2017 | Rihn | |
| 2017/0132827 A1 | 5/2017 | Tena et al. | |
| 2017/0161909 A1 | 6/2017 | Hamanaka et al. | |
| 2017/0301310 A1 | 10/2017 | Bonnier et al. | |
| 2017/0301316 A1 | 10/2017 | Farell | |
| 2017/0372505 A1 | 12/2017 | Bhat et al. | |
| 2018/0024635 A1 | 1/2018 | Kaifosh et al. | |
| 2018/0068178 A1 | 3/2018 | Theobalt et al. | |
| 2018/0122125 A1 | 5/2018 | Brewster | |
| 2018/0165864 A1 | 6/2018 | Jin et al. | |
| 2018/0211102 A1 | 7/2018 | Alsmadi | |
| 2018/0239526 A1 | 8/2018 | Varanasi et al. | |
| 2018/0338136 A1 | 11/2018 | Akaike et al. | |
| 2019/0121306 A1 | 4/2019 | Kaifosh et al. | |
| 2019/0122152 A1 | 4/2019 | McCoy et al. | |
| 2019/0172229 A1 | 6/2019 | Chan et al. | |
| 2019/0206181 A1 | 7/2019 | Sugai | |
| 2019/0325633 A1 | 10/2019 | Miller, IV et al. | |
| 2019/0392587 A1 | 12/2019 | Nowozin et al. | |
| 2020/0020138 A1 | 1/2020 | Smith et al. | |
| 2020/0020166 A1 | 1/2020 | Menard et al. | |
| 2020/0051304 A1 | 2/2020 | Choi et al. | |
| 2020/0078683 A1 | 3/2020 | Anabuki et al. | |
| 2020/0151963 A1* | 5/2020 | Lee | G06T 15/04 |
| 2020/0226811 A1 | 7/2020 | Kim et al. | |
| 2020/0258280 A1 | 8/2020 | Park et al. | |
| 2020/0294299 A1 | 9/2020 | Rigiroli et al. | |
| 2020/0302668 A1 | 9/2020 | Guo et al. | |
| 2020/0306640 A1 | 10/2020 | Kolen et al. | |
| 2020/0310541 A1 | 10/2020 | Reisman et al. | |
| 2020/0364303 A1 | 11/2020 | Liu et al. | |
| 2021/0019916 A1 | 1/2021 | Andreev | |
| 2021/0042526 A1 | 2/2021 | Ikeda et al. | |
| 2021/0074004 A1 | 3/2021 | Wang et al. | |
| 2021/0097266 A1 | 4/2021 | Mangalam et al. | |
| 2021/0125036 A1 | 4/2021 | Tremblay et al. | |
| 2021/0142440 A1 | 5/2021 | Ahn et al. | |
| 2021/0192357 A1 | 6/2021 | Sinha et al. | |
| 2021/0217184 A1 | 7/2021 | Payne et al. | |
| 2021/0220739 A1 | 7/2021 | Zinno et al. | |
| 2021/0252403 A1 | 8/2021 | Stevens | |
| 2021/0255304 A1 | 8/2021 | Fontijne et al. | |
| 2021/0279956 A1* | 9/2021 | Chandran | G06V 40/175 |
| 2021/0308580 A1 | 10/2021 | Akhoundi et al. | |
| 2021/0312688 A1 | 10/2021 | Akhoundi et al. | |
| 2021/0312689 A1 | 10/2021 | Akhoundi et al. | |
| 2021/0316221 A1 | 10/2021 | Waszak | |
| 2021/0335039 A1 | 10/2021 | Jones et al. | |
| 2021/0390789 A1 | 12/2021 | Liu et al. | |
| 2022/0020195 A1 | 1/2022 | Kuta et al. | |
| 2022/0051003 A1 | 2/2022 | Niinuma et al. | |
| 2022/0138455 A1 | 5/2022 | Nagano et al. | |
| 2022/0198733 A1 | 6/2022 | Akhoundi et al. | |
| 2022/0222892 A1* | 7/2022 | Luo | G06T 17/00 |
| 2022/0383578 A1 | 12/2022 | Kennewick, Sr. et al. | |
| 2022/0398795 A1 | 12/2022 | Phan | |
| 2022/0398796 A1 | 12/2022 | Phan | |
| 2023/0146141 A1 | 5/2023 | Stevens | |
| 2023/0186541 A1 | 6/2023 | Starke et al. | |
| 2023/0398456 A1 | 12/2023 | Akhoundi | |

FOREIGN PATENT DOCUMENTS

| | | |
|---|---|---|
| CN | 105405380 A | 3/2016 |
| CN | 105825778 A | 8/2016 |
| CN | 107427723 A | 12/2017 |
| CN | 109672780 A | 4/2019 |
| JP | 2018-520820 A | 8/2018 |
| JP | 2019-162400 A | 9/2019 |

OTHER PUBLICATIONS

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appearin Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computacion y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

(56) References Cited

OTHER PUBLICATIONS

Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", in ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (No. 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Ali, Kamran, and Charles E. Hughes. "Facial expression recognition using disentangled adversarial learning." arXiv preprint arXiv: 1909.13135 (2019). (Year: 2019).
Qiao, Fengchun, et al. "Geometry-contrastive gan for facial expression transfer." arXiv preprint arXiv:1802.01822 (2018). (Year: 2018).
Zhang, Jiangning, et al. "Freenet: Multi-identity face reenactment." Proceedings of the IEEE/CVF conference on computer vision and pattern recognition. 2020. (Year: 2020).
R. P. Prager, L. Troost, S. Bruggenjurgen, D. Melhart, G. Yannakakis and M. Preuss, "An Experiment on Game Facet Combination\," 2019, 2019 IEEE Conference on Games (CoG), London, UK, pp. 1-8, https://ieeexplore.ieee.org/stamp/stamp.jsp?tp=&arnumber= 8848073 (Year: 2019).

\* cited by examiner

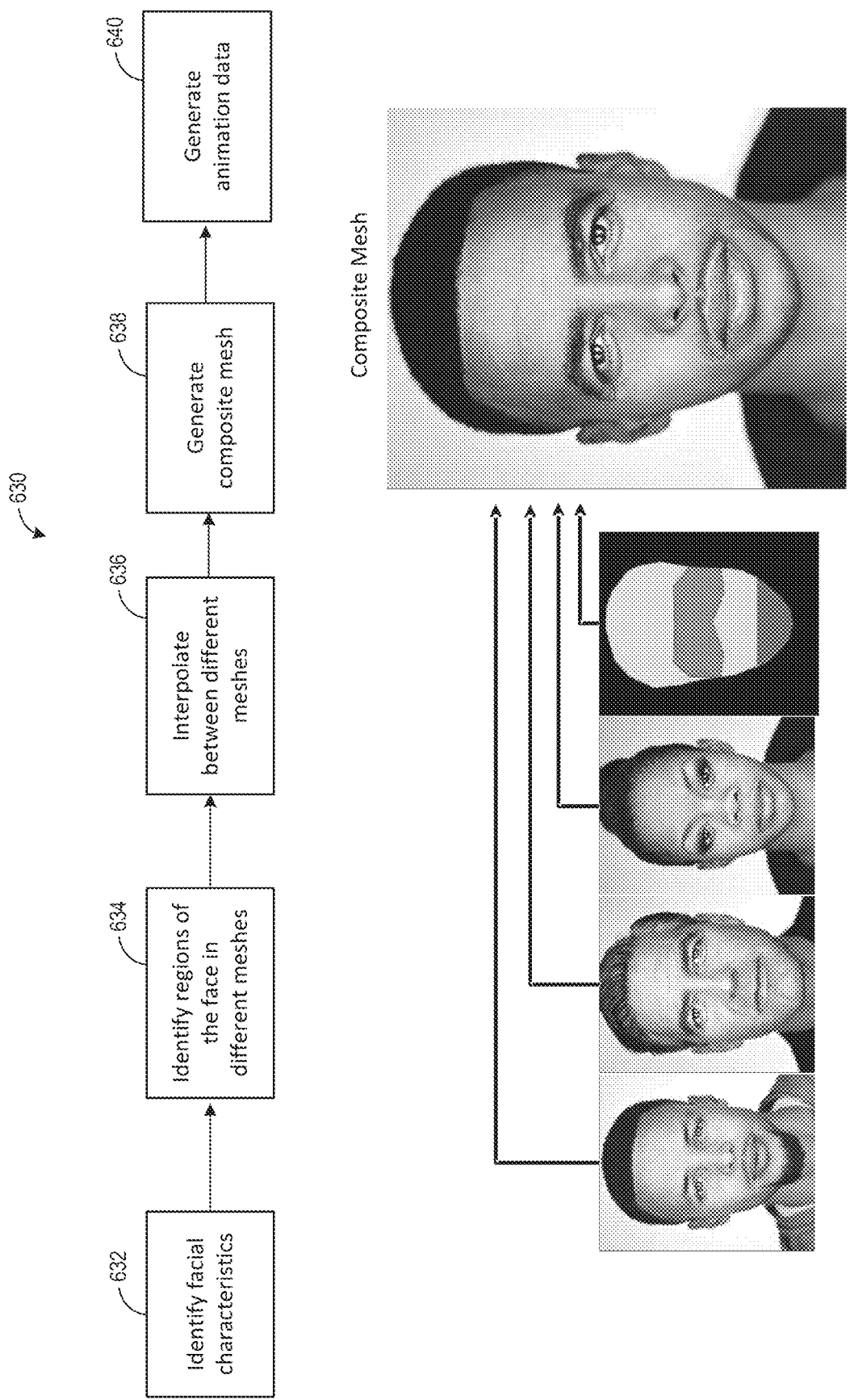

ENHANCED SYSTEM FOR GENERATION OF FACIAL MODELS AND ANIMATION

TECHNICAL FIELD

The present disclosure relates to systems and techniques for generation of facial expressions, textures, and meshes for virtual character models. More specifically, this disclosure relates to machine learning techniques for character model generation of human faces.

BACKGROUND

Electronic games are increasingly becoming more realistic due to an increase in available processing resources. The games can include rich, lifelike, characters that are created to follow complex scripts, and are placed in video games via computationally expensive animation processes. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game designers. As an example, electronic game designers may be required to create very rich, and detailed, models of character faces and expressions. As another example, electronic game designers may be required to create fluid, lifelike, expressions for each character within a game.

A character may be animated to emote, and in so doing the character's face may express disparate feelings while providing dialogue. For example, a character may express feelings of happiness, apprehension, fear, and so on. Generally, video game modelers are required to manipulate a 3D model of a character's face to arrive at each emotion. As an example, a video game modeler may modify the character's face to appear happy. This modification may stem from the video game modeler's utilization of software to create a 3D model of the character's face, and then adjust the 3D model until it conforms to the emotion required. However, each character's range of facial expressions are required to be modeled separately. That is, a video game modeler will have to uniquely adjust a 3D model of each character's face until the face arrives at each of defined facial expression. The process can result in a large amount of work which is not transferable between characters.

Additionally, once each character's face is modeled, the modeled expressions are not easily adjustable to indicate variations on the expression. For example, a modeler can create a happy face for a character, and one or more variations that express slightly different emotions that are related to being happy (e.g., a bemused look). When the character is being animated, a video game animator may only be able to select from the happy face, or pre-configured variations, when animating a scene. Thus, the character's facial expressions can lack granularity seen in real humans as the same faces are being repeated.

SUMMARY OF CERTAIN EMBODIMENTS

Particular embodiments of the subject matter described in this specification can be implemented so as to realize one or more of the following advantages. Utilizing the techniques described herein, realistic facial animations, textures, and meshes may be rapidly generated for character models configured for use in electronic games. As will be described, machine learning techniques may be employed to learn representations of distinct human faces. For example, a facial model may be defined, at least in part, based on positions of a multitude of features on the human face. Example features may include eyes, a nose, a mouth, ears, and so on. As may be appreciated, these features may be adjusted on a person to generate various expressions or perform various actions, such as speak, blink, and the like. The features of faces may be analyzed by the machine learning techniques. Advantageously, the machine learning techniques may be generative models. The generative models may allow for generation of realistic facial expressions, textures, and meshes based on learned faces of humans.

At present, techniques to generate facial animations and models for character models may rely upon designers generating and adjusting the character models to define different types of expressions. For example, to define smiling, a designer would need to define the positions of the features of the face of the model. In this example, the designer may adjust may upturn the position the corners of mouth, and so on. While this may allow for a smile to be generated, it may also involve a substantial burden on the designer.

In the present disclosure, a technique can be used to generate facial expression data based on real world expression data generated by humans. The facial expression data can be captured using a capture device. The capture device can be a standard 2D capture device such as a camera, a phone, or other device that can be used to capture still images and/or video data. In this embodiment, the capture data can be submitted to an expression generation system that can be used to filter and process the data to identify expressions associated with the captured data. In some embodiments, the captured data provided by the user may be a video data captured at 60 fps. The capture data can be analyzed by the expression generation system. The expression generation system can pre-process the data to isolate the face of the user in the submitted data. The isolated face can then be submitted to the expression generation system model in order to identify range of motion expressions that are associated with the submitted data. The expression generation system can utilize generative modeling techniques, such an autoencoder.

The capture data can be input through an identification engine to determine an identity vector associated with a person's face. The identity vector can be invariant, in that it can identity person regardless of the expression or position of the face within the capture data. In some embodiments, the identification engine can be a machine learning based model, such as FaceNet. The identity vector and the source data can be provided to the expression generation system 100 for processing of range of motion data received from the capture data.

A user may select or submit an image of another face. The expression generation system can be configured determine an identity of the selected face and can be configured to generate facial expressions for the submitted face. In this manner, a user can submit an image of a face and the expression generation system can synthetically generate expressions for the submitted face. The system expression generation system can be configured to generate the expression in real time after the expression generation system has been sufficiently trained.

As will be described below, the expression generation system can use machine learning techniques to analyze the expressions of real-life persons. Positions of facial features may be labeled for an expression depicted in a frame of the video clip. As another example, the facial features for the expression may be labeled. In this way, expressions of the real-life person may be analyzed.

As will be described, generative machine learning models may be used (e.g., autoencoders, variational autoencoders, and so on). Thus, new expressions may be generated based on sampling the latent feature space. Advantageously, a designer may generate expressions for a face based on expressions of another person. Based on the learned latent feature space, a generative model may output expressions based on an image. For example, the generative model can encode an expression of a first person and decode the expression for a second person.

The techniques described herein therefore improve upon the functioning of prior software-based techniques to generate movement of in-game character models. As described above, prior techniques relied upon by designers to adjust positions of facial features on a skeleton underlying a character model. In contrast, the techniques described herein may allow for automated adjustment. Advantageously, the automated adjustment may be based on a latent feature space which encodes complex expression information. Using generative modeling techniques, complicated animations may be quickly generated.

In the present disclosure, techniques can be used to generate texture maps based 2D images. In some embodiments, the texture map generation system can use deep learning techniques, such as a convolutional neural network, to generate the texture maps. The model can generate one or more texture maps for each input 2D image received. The model can determine the relationship between the 2D input images and the output textures. The model can extract locations of the facial features. For example, the model may identify specific facial features depicted in an image or video frame. The model can use the 2D image data and the identity encoding to find the smallest activation vector that can represent expressions for meshes and textures. The model can use the extracted facial features to generate texture maps of the person. The generated texture maps can include diffuse texture maps and normal texture maps. The model can generate texture maps in realtime. For example, the texture maps can be generated at the rate at which a video plays, such as at 60 frames per second.

In the present disclosure, techniques can be used to generate meshes of a face and head of a virtual character model. In some embodiments, the mesh generation system can use deep learning techniques to generate meshes. The meshes can be based on a 2D image of a face of a person in conjunction with outputs generated by the expression generation system and texture map generation system.

Furthermore, certain generative machine learning models (e.g., conditional variational autoencoders) may be used to generate animation. As will be described, a machine learning model may be trained to reconstruct an input expression given one or more previous expressions. For example, the input expression and previous expressions may be obtained from an animation of a character or from video of a person. In this example, the previous expressions may be used as a condition in a conditional variational autoencoder. Advantageously, once trained the machine learning model may be used to generate realistic animations via sampling of a latent feature space. As an example, a sequence of expressions may be accessed. Based on the latent feature space, a new expression may be generated for the sequence. Via repeating this technique, for example using autoregressive methods, a multitude of new expressions may be generated for an animation.

Similarly, in some embodiments a machine learning model may be trained to reconstruct an input expression given labeled positions of portions of an expression (e.g., facial features). For example, the positions may be provided as conditions to a conditional variational autoencoder. In this way, the conditional variational autoencoder may learn to associate positions of facial features with specific expressions. Once trained, an expression may be modified via adjusting positions of facial features. In this way, a user may cause realistic movement of facial features from a starting expression.

The systems, methods, and devices of this disclosure each have several innovative aspects, no single one of which is solely responsible for the all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 6C illustrates another embodiment of training a model to generate a mesh of a character model using the mesh generation system.

Like reference numbers and designations in the various drawings indicate like elements.

DETAILED DESCRIPTION

Overview

Figure 1A:
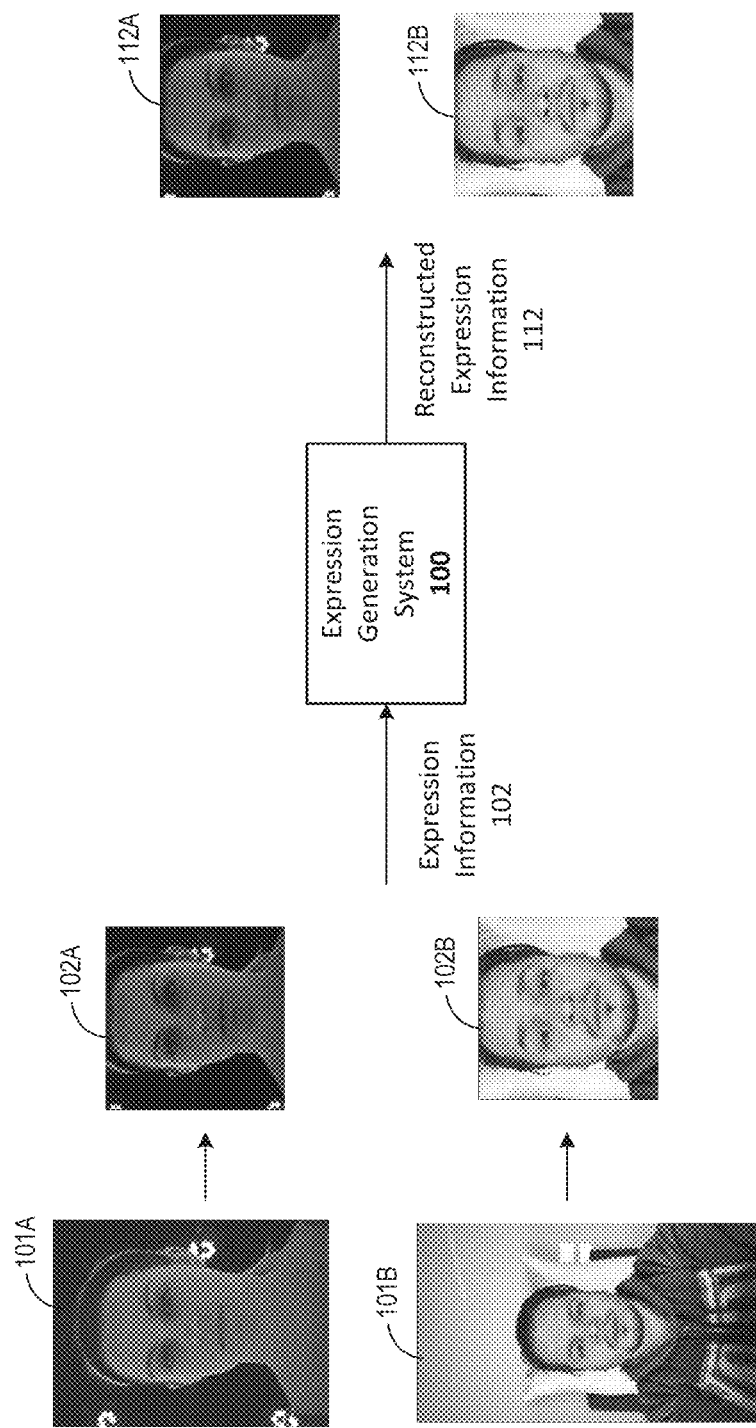
FIG. 1A illustrates a block diagram of an example expression generation system.

This specification describes, among other things, technical improvements with respect to generation of facial expressions, textures, meshes, and models for characters configured for use in electronic games. As will be described a system described herein (e.g., the expression generation system) may generate realistic facial expressions, textures and meshes based on analyzing data captured from real-world persons. Advantageously, the system may allow for substantially automated facial expression generation, texture map and normal map generation, mesh generation, animation of facial expressions, and so on. While electronic games are described, it may be appreciated that the techniques described herein may be applied generally to generation of facial expressions and features of character models. For example, animated content (e.g., TV shows, movies) may employ the techniques described herein.

Facial expressions for an in-game character may be defined, at least in part, based on distinct positions of the facial features of the in-game character. The distinct positions, for example, may be blended together to generate the expression. As an example, each expression may represent a discrete sample of an animation sequence to be performed by the in-game character. Thus, if motion is to depict talking, each expression may represent a snapshot of the facial features during speaking. The system may advantageously learn a latent feature space which encodes observable features defining these expressions (e.g., positions of facial features). As an example, the system may obtain a multitude of expressions of real-life persons. For example, there may be thousands, hundreds of thousands, and so on, obtained expressions. These expressions may, in some embodiments, be obtained from video of the real-life persons. Thus, certain expressions may represent discrete snapshots of a real-life person.

Each of the above-described expressions may be provided as an input to the system. For example, observable features of the expression may be provided as an input. Example observable features may include positions on the real-life person (e.g., two- or three-dimensional coordinates). These positions are referred to herein as facial features and may represent portions of a face or facial model which can move or be manipulated (e.g., eyes, nose, mouth, and so on).

The system may use machine learning techniques, an autoencoder, to reduce a dimensionality associated with the input features. In some embodiments, principle component analysis may be used as a dimensionality reduction technique. With respect to an autoencoder, the system may learn a latent feature space of a lower-dimension than the input features. The latent feature space may comprise a multitude of latent variables, such as 7, 9, 12, and so on. In some embodiments, a variational autoencoder may be used. Thus, the latent feature space may be (substantially) continuous and each latent variable may be defined, at least in part, as a distribution (e.g., a Gaussian). In this way, the input features defining an expression may be encoded in the latent feature space.

With respect to an autoencoder, an encoder may learn to map input features of expressions to the latent feature space. A decoder may then learn to map the latent feature space to an output defining features of expressions. Thus, the autoencoder may be trained to generate an output expression which reproduces an input expression. The learned latent feature space may represent a bottleneck, which causes each latent variable in the latent feature space to encode complex information associated with expressions. In this way, the autoencoder may learn a latent feature space representing human expressions.

In some embodiments, the techniques described herein can be used during the development process of the electronic game. In some embodiments, the techniques described herein may be performed during in-game gameplay of an electronic game. For example, a user may wish that an in-game character within an electronic game may have one or more expressions provided by the user. In this example, the user may provide video footage of the expression for the in-game character to mimic. The electronic game may thus generate expressions provided by the user in a realistic sequence of expressions.

In some embodiments, the user may provide an image of a face to be used for an in-game character to be used within the electronic game. For example, the FGS can generate texture map(s) and meshes for generating a facial model for use as an in-game character within the electronic game.

Example Block Diagrams—Latent Feature Space

FIG. 1A illustrates a block diagram of an example expression generation system 100. In the illustrated embodiment, the expression generation system 100 is analyzing expression information 102 and generating reconstructed expression information 112. The expression generation system 100 may, in some embodiments, be a system of one or more computers, one or more virtual machines executing on a system of one or more computers, and so on. In some embodiments, the expression generation system 100 may be implemented as a module, or software (e.g., an application), which may execute on a user device (e.g., a laptop, tablet, console gaming system, and so on).

Two expressions 102A-102B are illustrated as being included in the expression information 102. While two expressions are illustrated, it may be appreciated that thousands, hundreds of thousands, millions, and so on, expressions may be input to the expression generation system 100. The expression information 102 may be obtained via analyzing images and/or video of real-life persons. For example, 2D videos of faces preforming a predefined range of motions may be analyzed. In this example, each frame of the video may depict one or more expressions. As another example, motion capture information may be obtained from a capture studio. In this example, a person may be placed in a light room where multiple cameras are configured to synchronize the capture of facial data from all angles.

Each image and/or frame of video may be analyzed to identify features to be input into the expression generation system 100. For example, the features may include locations of facial features. Example facial features may include a nose, cheeks, eyes, eyebrows, the forehead, ears, mouth, teeth, and so on. Thus, a facial feature may represent a portion of real-life person which is capable of movement or otherwise controlled by the real-life person. The locations of the facial features may be defined, in some embodiments, as two- or three-dimensional coordinates. For example, a coordinate reference frame may be defined. Each image and/or frame of video may be analyzed to map facial features of a real-life person onto the coordinate reference frame. As an example, movement of the eyes or mouth in a video clip may be analyzed to determine relative movement of each of the facial features. This relative movement may be translated to the coordinate reference frame for use by the expression generation system 100. In some embodiments, deep learning techniques (e.g., convolutional neural networks) may be utilized to extract locations of the facial features. For example, a deep learning model may be trained to identify specific facial features depicted in an image or video frame.

Similarly, motion capture information may be analyzed to identify features to be input into the expression generation system 100. Motion capture information may, in some embodiments, allow for rapid importation of locations of facial features on a real-life person. For example, the motion capture information may indicate locations of the person's facial features at discrete times. Each discrete time may be defined as a particular expression of the person. Thus, the location of the facial features may be identified for each expression.

In addition to locations of facial features, in some embodiments the expression generation system 100 may obtain additional information as inputs. For example, positions of the facial features, orientations of the facial features, and so on, may be used.

In FIG. 1A, expression 101A is graphically depicted as representing the capture data for a particular expression A. Though only a single image is illustrated, the capture data can be representative of video data that illustrates a range of expressions generated by the depicted person. Additionally, the capture data illustrated in 101 can be preprocessed in order to isolate the face and expression of the person. The image or video can be manipulated so that the face of the person is positioned in substantially the same position within the frame. As illustrated, capture data 101A and 101B are of different sizes, aspect ratios, and the persons within the frames are positioned at different relative locations. The capture data can be manipulated, such as by scaling, cropping, and converting the color format of the capture data. Accordingly, the expression input information 102 can be formatted so that the expressions of the persons within the capture data can be better analyzed and learned. To help the autoencoder find the facial features shared between the two captured subjects, the process can be done in a cropped region of the face as well as a very small resolution. The small resolution can help the autoencoder to understand global features of the face. Additionally, the capture data used for training the expression generation system 100 can sometimes include traditional range of motion capture data, which includes a person going through a defined series of facial motions in an attempt to capture all possible muscle activations of the person's face.

The expression 102A is graphically depicted as representing a particular expression, though it is generally indicative of a video including a plurality of expressions. In some embodiments, location information for facial features may be provided as an input to the expression generation system 100. For example, the location information may be combined into a data structure, such as a vector or matrix, and define dimensional locations of the facial features. Expression 102B illustrates a different face with an expression. This expression 102B illustrates a different orientation of the facial features on the face as compared to the expression 102A.

In some embodiments, expression information 102 including a multitude of expressions (e.g., hundreds, thousands, and so on) may be provided to the expression generation system 100. As will be described below, the expression generation system 100 may train a machine learning model (e.g., an autoencoder) based on the multitude of expressions. Thus, the multitude of expressions may represent a batch of expressions. In some embodiments, there may be a multitude of batches. For each batch, the expression generation system 100 may update the machine learning model. With respect to an autoencoder, the expression generation system 100 may learn to reproduce a same output expression as provided in an input to the system 100.

For example, subsequent to training, reconstructed expression information 112 may be generated by the expression generation system 100. An example input expression is illustrated in FIG. 1A, along with reconstructed expressions generated by two models 112A and 112B. As described herein, the models may employ dimensionality reduction techniques to learn a latent feature space. The model may, as an example, be an autoencoder. Thus, the expression generation system 100 may learn to reconstruct expressions based on the latent feature space.

Figure 1B:
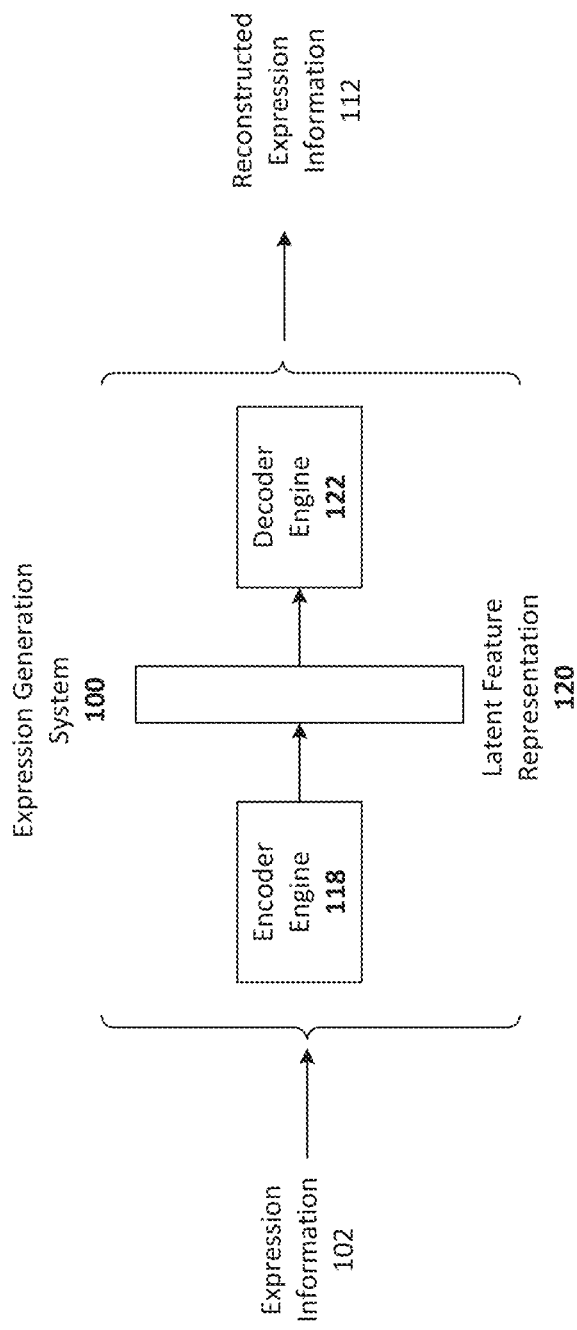
FIG. 1B illustrates another block diagram of the example expression generation system.

FIG. 1B illustrates another block diagram of the example expression generation system 100. In this example, the expression generation system 100 may implement an autoencoder. As illustrated, the autoencoder may include an encoder engine 118 usable to map input expression information 102 to a latent feature representation 120. The autoencoder may also include a decoder engine 122 to generate reconstructed expression information based on the latent feature representation 120.

As may be appreciated, an autoencoder is an unsupervised machine learning technique capable of learning efficient representations of input data. The encoder engine 118 and decoder engine 122 may represent neural networks, such as dense (e.g., fully connected) neural networks. As described above, the output of the encoder engine 118 may be provided into the decoder engine 122 through a shared layer of variables (e.g., hidden variables) which may be referred to as the latent feature representation of the input. As may be appreciated, the output of the encoder engine 118 may be obtained via a forward pass of input expression information 102 through layers forming the encoder engine 118. Advantageously, the latent feature representation 120 may be of lower-dimensions than the input expression information 102. Thus, the latent feature representation 120 may be an encoding of input expression information 102 with respect to a latent feature space. The encoding may comprise values for a multitude of latent variables.

In order to find correspondence between the faces of different persons, the expression generation system 100 would need to analyze all possible muscle activations from their face, such as a full range of motion capture data sample. However, since the capture data cannot reliably do exactly the same expressions exactly at the same moment in time, the expression generation system 100 needs to calculate correspondence between faces. The purpose is to teach the expression generation system 100 how to identify similar facial expressions on dissimilar faces.

Additionally, the expression generation system 100 can be trained to account for varying fields of view in the input data. In order to train the model, the capture data can be synthetically augmented and manipulated so that the model can experience conditions of varying fields of view. The input data can be translated, scaled, rotated, or otherwise manipulated to provide the expression generation system 100 with examples of different conditions. This can improve the chances that the expression generation system 100 will learn to retarget and properly analyze input data after training.

Figure 1C:
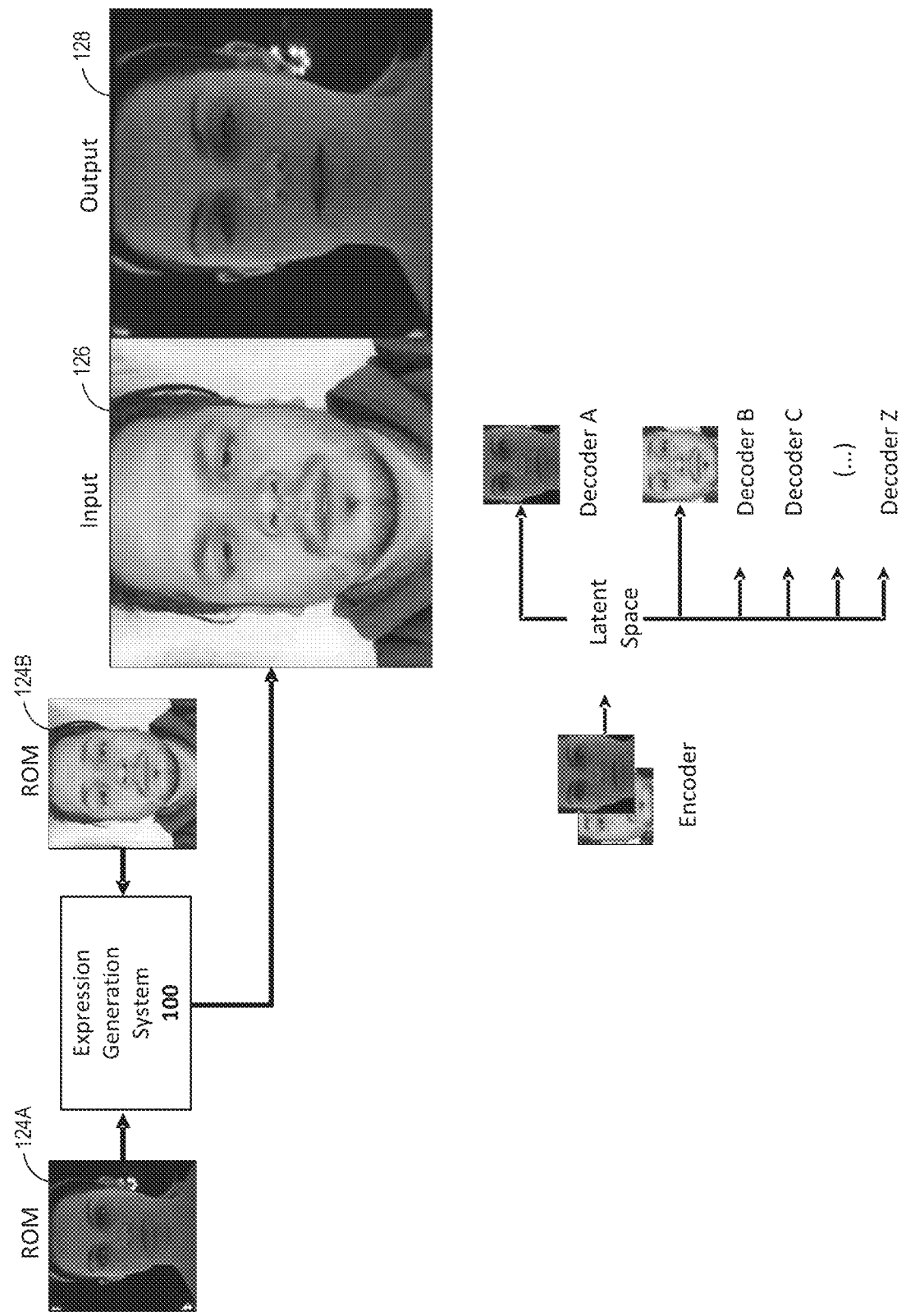
FIG. 1C illustrates an example input and output using an embodiment of the expression generation system.

FIG. 1C illustrates an example of the process of training the expression generation system 100 and then generating a new expression 128 based on input 126. As described above, in some embodiments an autoencoder may be used. The expression generation system 100 may include a trained encoder that encodes the expression information to a latent space representation. The encoder may be a universal encoder for translating the input images and video into latent feature space representations. A resulting latent feature representation may be generated which is based on distributions of latent variables. Using the range of motion training data 124A and 124B, the expression generation system 100 can train decoder models for each person. Each trained decoder model can then be used to decode a latent feature space representation in order to output an expression on the person represented in the latent space.

A new 2D image of the expression 128 for person A may be generated based on the input expression 126 of person B. The expression 126 is generated using decoder A trained for person A based on the latent feature distributions encoded from the input expression of person B. The new image is a new image generated by the decoder. As illustrated in FIG. 1C, a different decoder is trained and used to generate and output an accurate new image of a 2D expressions of a specific person.

Advantageously, once a decoder model is generated for a person, the new expressions of the person may be newly generated as compared to input expression information. For example, the latent feature distributions may be generated based on the input expression information. Once generated, for example when the decoder is trained, the resulting latent feature distributions may be substantially continuous. Thus, samples of the distributions may be obtained which do not precisely correspond with mappings of input expression information onto the latent feature space. In this way, the decoder engine may generate new expressions based on the samples. These expressions may advantageously represent realistic expressions of persons.

While the process described above is advantageous for generating expressions for persons for which a model can be generated, it can be a time consuming process to generate models for each individual. Additionally, the generation of the model requires capture data representing a sufficient amount of range of motion data for a model to be generated for a person. In some instances, it can be difficult to require necessary amount of data and can be expensive to produce on a large scale.

Figure 2A:
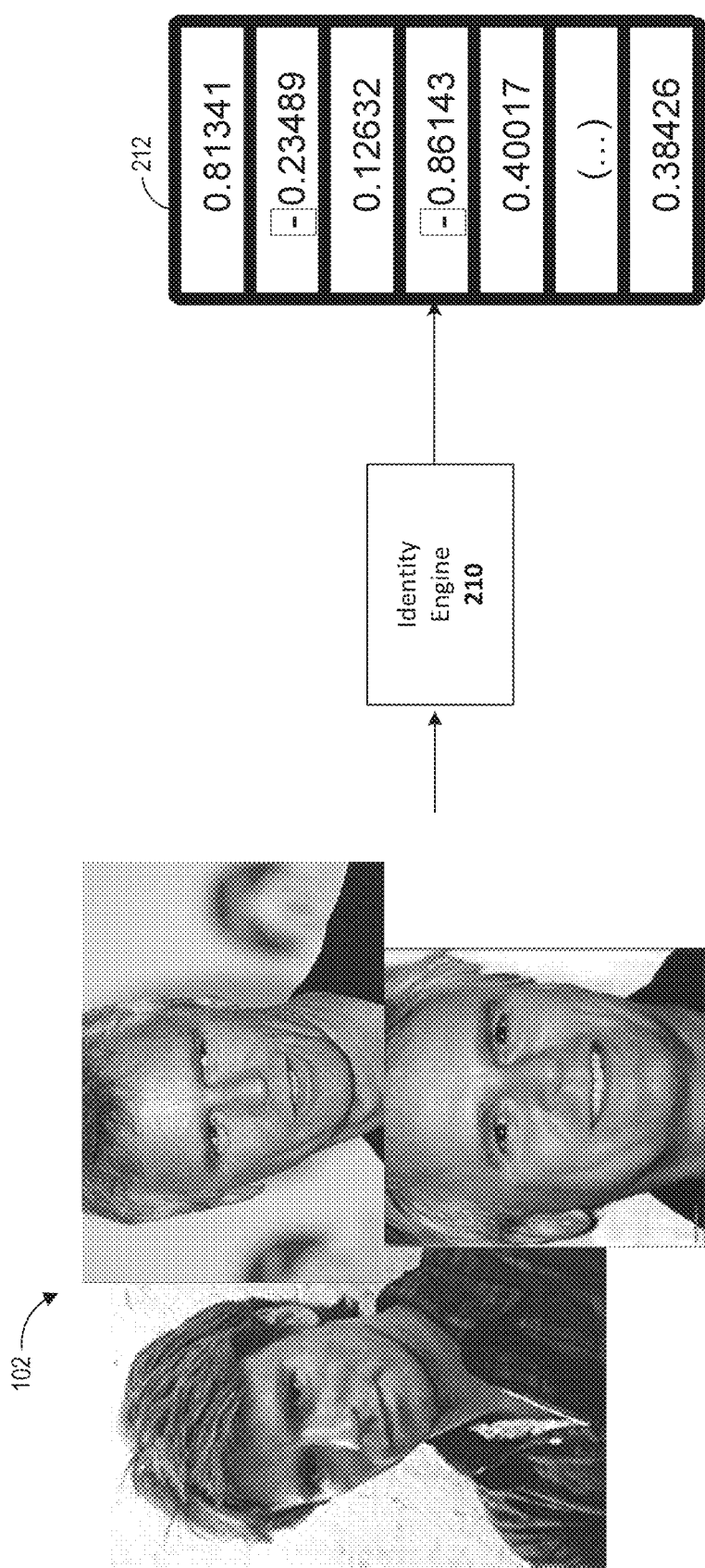
FIG. 2A illustrates a block diagram of an example identity engine.
Figure 2B:
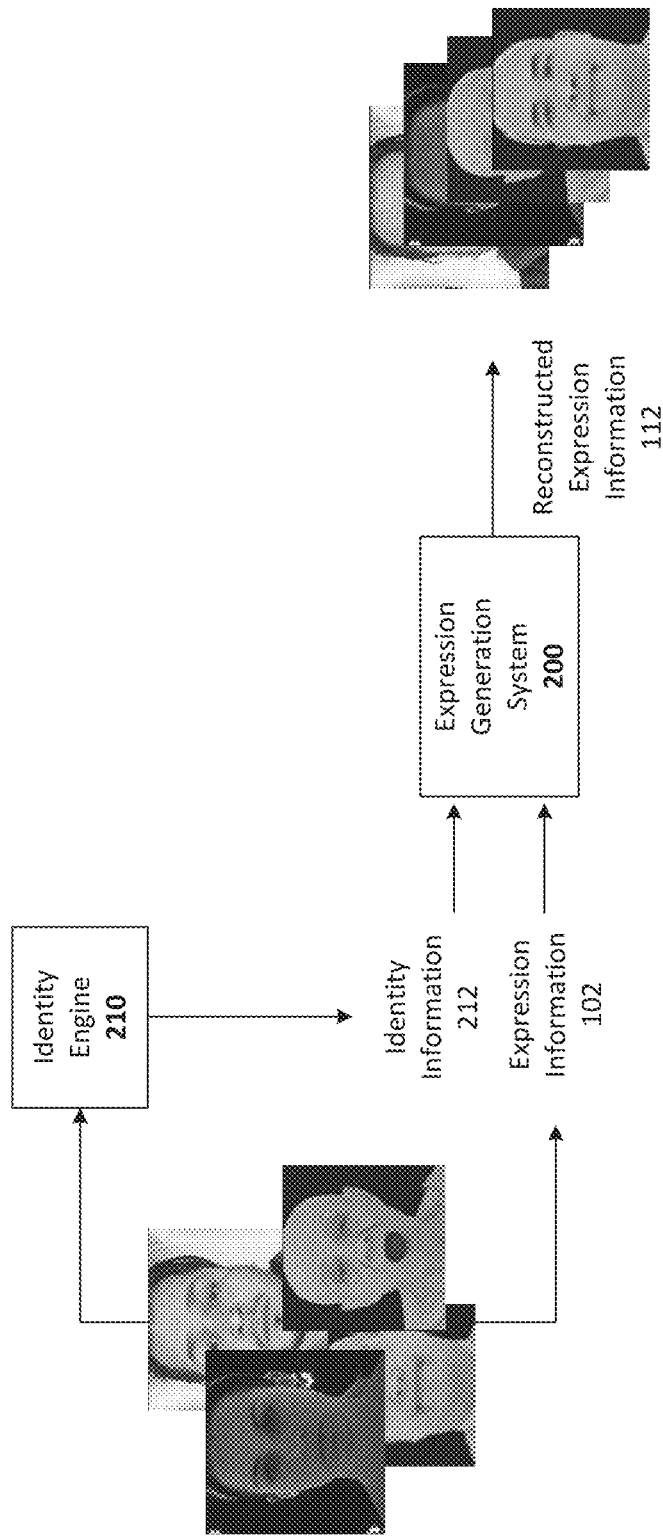
FIG. 2B illustrates a block diagram of an example expression generation system using an identity engine.
Figure 2C:
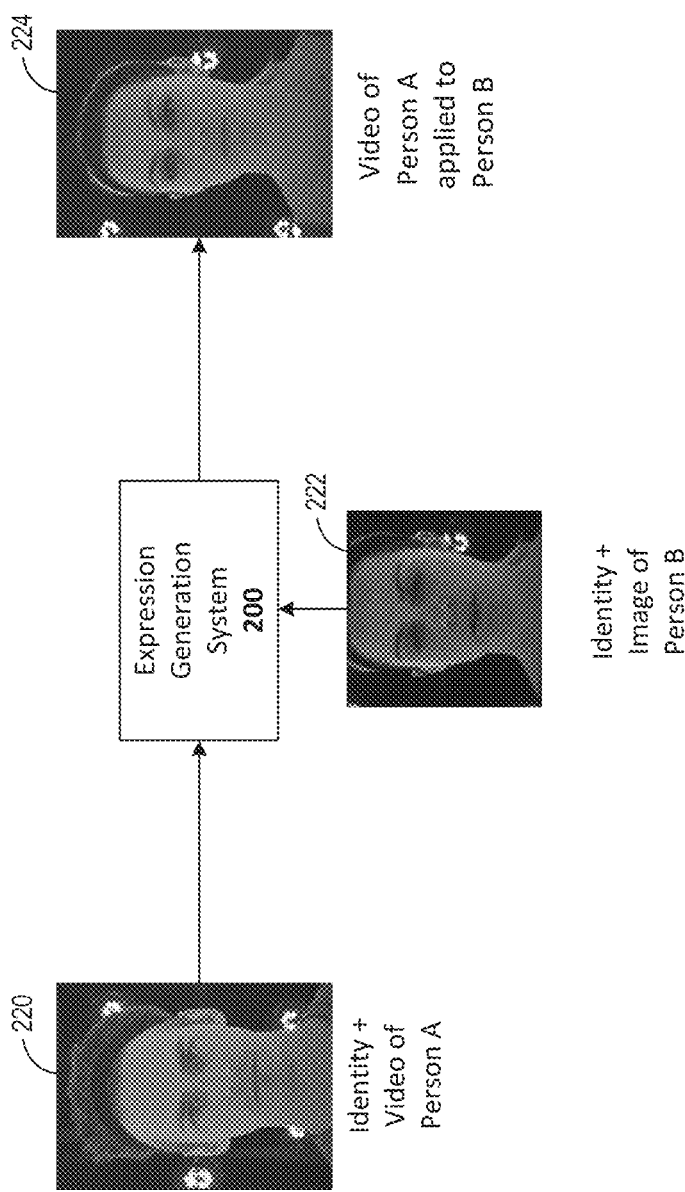
FIG. 2C illustrates example inputs and outputs from an embodiment of the expression generation system using an identity engine.

FIG. 2A-2C describe another embodiment of the expression generation system 200 that generates a generative model that is capable of many to many correspondence for generating expressions for persons. With specific reference to FIG. 2A, an identity engine 210 is illustrated. The identity engine 210 case use machine learning techniques to provide a facial recognition system to generate identification representations 212 based on an input face of a person 102. The identity engine 200 can be based on facial recognitions systems, such as FaceNet. The identity engine can generate a high-quality face mapping from the images using deep learning architectures such as ZF-Net and Inception. Then it used a method called triplet loss as a loss function to train this architecture.

One embodiment of a process for generating identification representations 212 can include a finding the bounding box of the location of faces. Then finding facial features such as length of eyes, length of mouth, the distance between eyes and nose, and so on. The number of facial features chosen may vary, for example, from five to seventy-eight points, depending on annotation. After identifying facial features, the distance between these points is measured. These values are used to classify a face. The faces can be aligned using the facial features. This can be done to align face images displayed from a different angle in a straightforward orientation. Then the features extracted can be matched with a template. The aligned faces can be used for comparison. The aligned face can then be analyzed to generate an embedding of the face using face clustering. The resultant identification encoding of the face, also referred to as an identification representation, can be output for further use be the expression generation system 200. Though not perfect, the identification representation can be invariant to occlusion, pose, lighting and even age, and other factors that would affect perceptive differences between different images of the same person. The identification representation is representative of an encoding that provides an identity of a person, which can also be referred to as the identity or identity information 212 of a person.

FIG. 2B illustrates an embodiment of training the expression generation system 200. The expression generation system 200 can be an autoencoder and can be trained in a similar manner as described with respect to FIG. 1B. In addition to the expression information 102 provided to expression generation system 100, the expression generation system 200 is trained using the identity information 212 for each of the persons for which expression information 102 is provided.

As may be appreciated, an autoencoder is an unsupervised machine learning technique capable of learning efficient representations of input data. The encoder engine 118 and decoder engine 122 may represent neural networks, such as dense (e.g., fully connected) neural networks. As described above, the output of the encoder engine 118 may be provided into the decoder engine 122 through a shared layer of variables (e.g., hidden variables) which may be referred to as the latent feature representation of the input. As may be appreciated, the output of the encoder engine 118 may be obtained via a forward pass of input expression information 102 through layers forming the encoder engine 118. Advantageously, the latent feature representation 120 may be of lower-dimensions than the input expression information 102. Thus, the latent feature representation 120 may be an encoding of input expression information 102 with respect to a latent feature space. The encoding may comprise values for a multitude of latent variables.

The use of identification information 212 during the training helps the expression generation system 200 to decouple the expression of the input data from the person in the input data. This allows the expression generation system 200 to train a universal encoder and a universal decoder. The trained encoder can be configured to generate a latent feature space representation of an expression from an input image that is substantially decoupled from the identity of the person within the input image. The latent feature representation can provide expression information that is substantially identity invariant. The trained decoder can universally generate 2D images of expressions without requiring a separate decoder for each individual. Rather, the decoder can generate a 2D image of an expression based on the latent feature representation for an expression and an identification repression for the identity of an individual.

FIG. 2C illustrates an example of the process of generating a new expression 224 of person B based on input 220 of person A and input 222 person B. As described above, in some embodiments an autoencoder may be used. The expression generation system 200 includes a trained encoder that encodes the expression information to a latent space representation. The input data 220 provided to expression generation system 200 for person A includes a video of animation of person A. The input data 222 provided to expression generation system 200 for person B includes an image of person B. The corresponding video and image data are provided to an identity engine 200 to generate identity representations for each person. The identity representations are submitted as part of the input data provided to the expression generation system 200. The encoder may be a universal encoder for translating the input images and video into latent feature space representations. A resulting latent feature representation may be generated which is based on distributions of latent variables. The trained decoder can be a universal encoder that can then be used to decode a latent feature space representation in order to output an expression on the person represented in the latent space.

The decoder can use the identity of person A to identify expressions of person A, which are decoupled from the identity of person A. The decoder can then use the identity of person B to apply the expressions of person A to person B without requiring a separate decoding model that is specific to person B. The generated output 224 is a video of the expressions of person A output on person B. Each frame of the generated video of person B can correspond to a frame of the input video of person A. The decoder uses latent feature distributions encoded from the input expression of person A in conjunction with the identity representations of persons A and B. The new video are new frames generated by the decoder.

Advantageously, once a decoder model is generated, new expressions for a person may be generated based on an image of a new person by using a generated identity representations of the new person. Once generated, for example when the decoder is trained, the resulting latent feature distributions may be substantially continuous. Thus, samples of the distributions may be obtained which do not precisely correspond with mappings of input expression information onto the latent feature space. In this way, the decoder engine may generate new expressions based on the samples. These expressions may advantageously represent realistic expressions of persons. The expressions can be essentially decoupled from the identity of the input person and can be used to generate sets of identity invariant expression sets. For example, expression generation system 200 can be configured to generate a range of motion data set for a person based on an image of the person.

Example Flowchart/Block Diagrams—Generating Output Expression(s)

Generating realistic expressions for a person for use within an electronic game is of great importance to electronic game designers. For example, generating realistic expressions may allow for game designers to generate realistic in-game character animation of facial expressions. As will be described, the techniques described herein may allow for rapid generation of 2D images of realistic facial expressions of a real-life person based on input of 2D image(s) and/or video of person. For example, animation of expressions of a person may generated by the system 300 based on a single 2D input image of the person.

Figure 3:
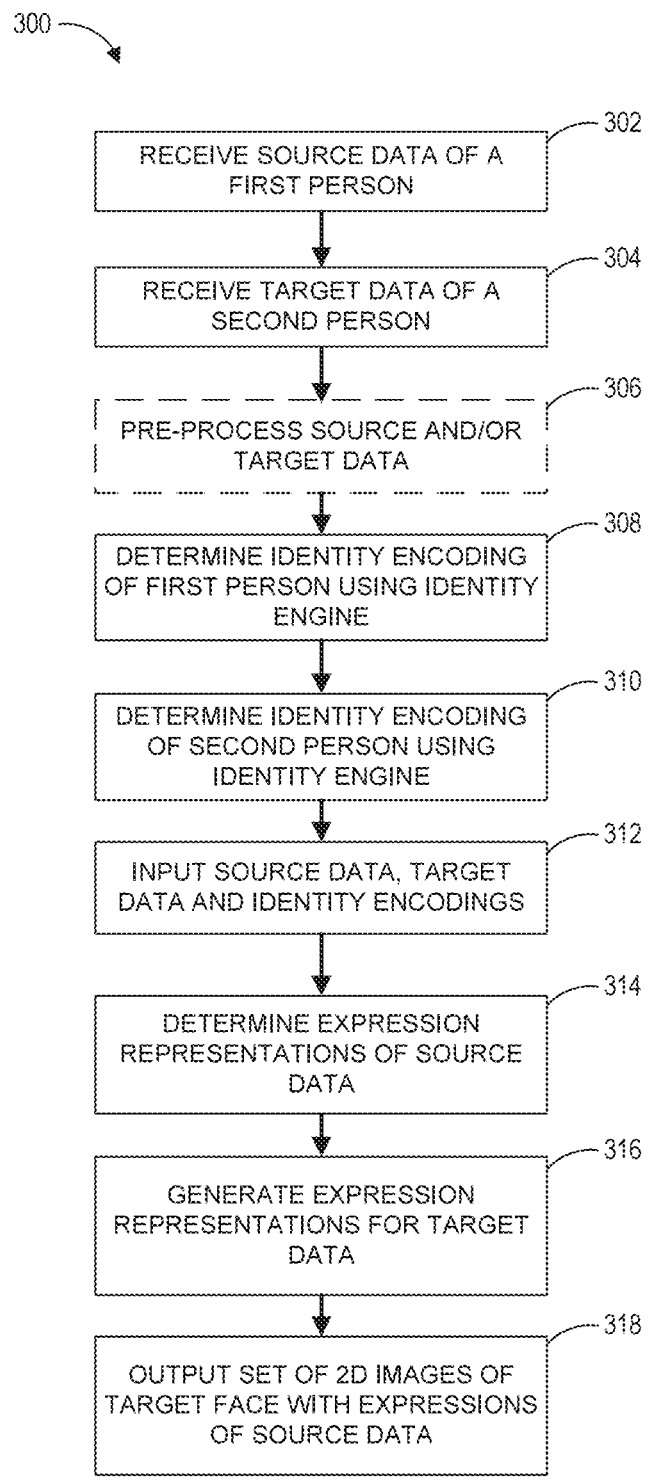
FIG. 3 is a flowchart of an example process for generating output expressions using the expression generation system.

FIG. 3 is a flowchart of an example process 300 for generating output expressions based on a latent feature space. For convenience, the process 300 will be described as being performed by a system of one or more computers (e.g., the expression generation system 200).

At block 302, the system obtains source data of a first person. The source data may be one or more images and/or video of a real-life first person.

At block 304, the system obtains target data of a second person. The target data may be one or more images and/or video of a real-life second person.

At block 306, the system can optionally pre-process the source and/or target data. The capture data can be preprocessed in order to isolate the face and expression of the person. The image or video can be manipulated so that the face of the person is positioned in substantially the same position within the frame. The capture data can be manipulated, such as by scaling, cropping, and converting the color format of the data. The data can be formatted so that the expressions of the persons within the capture data can be better analyzed.

At block 308, the system determines an identity encoding of the first person using an identity engine. At block 310, the system determines an identity encoding of the second person using the identity engine. The identity engine case use machine learning techniques to provide a facial recognition system to generate an identification encoding based on an input of one or more images of the first person. The generated identification encoding of the respective face of the person can provide an identifier that is invariant to occlusion, pose, lighting, age, and other factors.

At block 312, the target data, source data and corresponding identities of the first person and the second person are provided as inputs to the expression generation system. The expression generation system 200 can include a generative model (e.g., an autoencoder), as described in FIGS. 2A-2C, with a trained encoder and decoder for analysis of the source and target data.

At block 314, the system determines feature encodings for the expressions using the generative model. The encoder may be used to determine a latent feature space for each image/frame of expressions of the source data. The system may provide the source data images and identification encoding to the encoder of the generative model. This encoder may map the expression(s) of the first person to the latent feature space. The system may determine feature encodings for the expression(s) of each frame/image of the source data. The feature encodings may represent locations in the latent feature space (e.g., values for the latent variables). The latent feature representation can provide expression information that is substantially identity invariant.

At block 316, the system generates expression representations for the target data. The decoder can decode the latent feature space representation in order to output expressions of the first person on the second person represented in the latent space. The decoder can use the identity of the first person to identify expressions of the first person, which are decoupled from the identity of the first person. The decoder can then use the identity of the second person to transform the latent space representations of the expressions of the first person to the second person. A transformation can be performed for the latent space representations of each image/frame of the target data.

At block 318, the system outputs a set of 2D images of the second person with the expressions included in the source data. The generated output is a video of the expressions of the first person output on the second person. Each frame of the generated video of the second person can correspond to a frame of the input video of the first person. The decoder uses latent feature distributions encoded from the input expression of the first person in conjunction with the identity representations of the first and second persons. The output data set are new synthetically generated frames from the decoder that are independent of any preexisting image data associated with the second person.

In some embodiments, the system may not receive the source data from an outside source. Rather the source data can be a predefined set of expressions, such as traditional range of motion (ROM) expressions, which includes a person going through a defined series of facial motions in an attempt to capture all possible muscle activations of the persons face. In which case, the source data can be used to generate a standard set of 2D output images based on an input image of the second person.

In some embodiments, the generated output expressions may be provided to a game designer for use in further game development processes. For example, the output images can be used in the processes described herein with respect to the automated generation of additional 2D and 3D data associated with the second person. The output data can be used as input for additional machine learning based models.

In some embodiments, the source data and/or the target data may be provided by a user of a game application. For example, the user may provide a video of animations that the user would like an in-game character to perform. The user may also provide a target image. Thus, using the processes disclosed herein, the submission of the images of the user can result in generation of expressions displayed on an in-game character of the electronic game.

Texture Map Generation

Figure 4A:
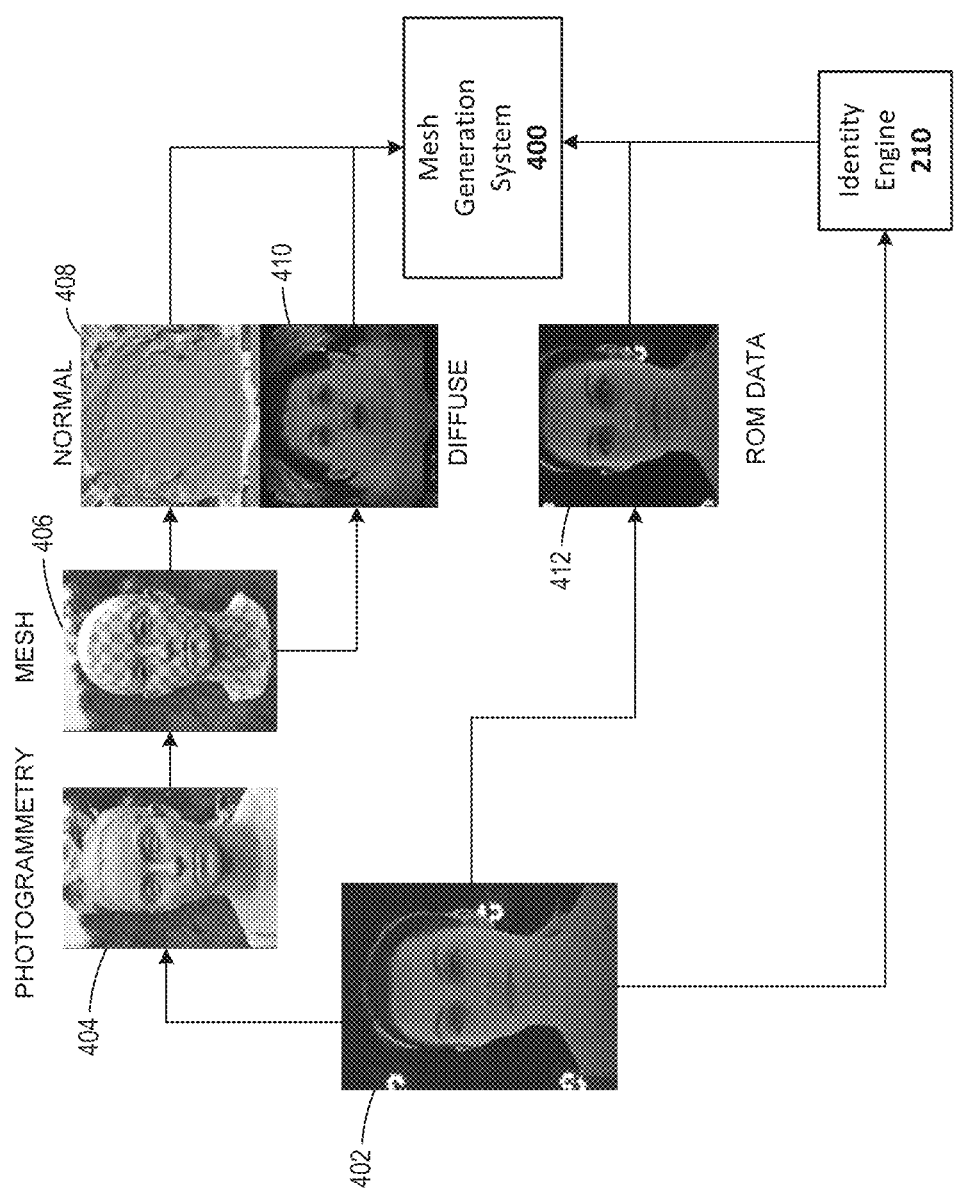
FIG. 4A illustrates a block diagram of an example texture map generation system.
Figure 4B:
FIG. 4B illustrates an example of training outputs of diffuse texture maps and normal texture maps of the example texture map generation system.
Figure 4B:
Figure 4C:
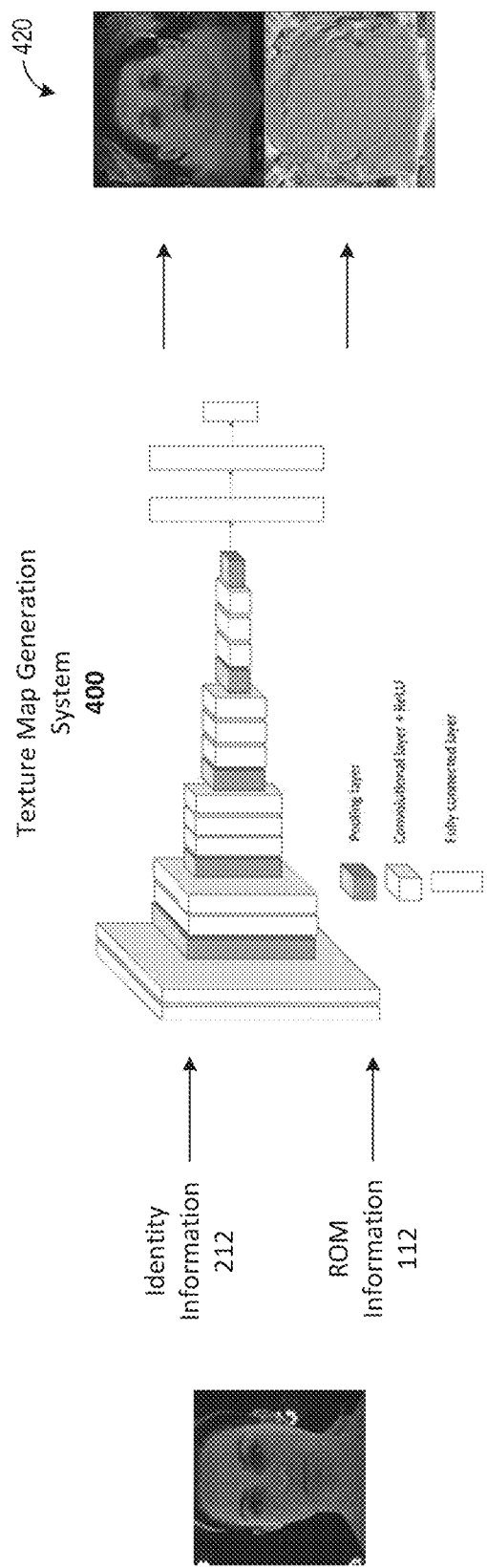
FIG. 4C illustrates an example input and output using an embodiment of the texture map generation system.

FIGS. 4A-4C illustrates an embodiment a texture map generation system 400 for generating and outputting texture maps of a face, such as diffuse texture maps and normal texture maps, based on a 2D image of a face of a person. The texture map generation system 400 may, in some embodiments, be a system of one or more computers, one or more virtual machines executing on a system of one or more computers, and so on. In some embodiments, the texture map generation system 400 may be implemented as a module, or software (e.g., an application), which may execute on a user device (e.g., a laptop, tablet, console gaming system, and so on).

FIG. 4A illustrates a block diagram of exemplary input data used for training a texture map generation system 400. In the illustrated embodiment, the texture map generation system 400 is trained using capture data 402, photogrammetry data 404, mesh data 406, texture map data including normal texture map data 408 and diffuse texture map data 410, range of motion data 412, and one or more outputs from the identity engine 210. The set of data is being provided as illustrative of the types of data that can be used for training of a machine learning model. It may be appreciated that thousands, hundreds of thousands, millions, and so on, samples of these types of data may be input to the texture map generation system 400.

The process of generating the capture data 402 may be obtained via analyzing images and/or video of real-life persons. 2D videos of the person preforming a predefined range of motions may be captured an analyzed. In this example, motion capture information may be obtained from a capture studio. The person may be placed in a light room where multiple cameras are configured to synchronize the capture of facial data from all angles.

A subset of the capture data 402 can be output as a 2D video of a range of motion data sample 412 for the person. The capture data 402 can be manipulated, such as by scaling, cropping, and converting the color format of the data. The data can be formatted so that the expressions of the persons within the capture data can be better analyzed. The range of motion data 412 can be provided as input to the texture map generation system 400. The range of motion data 412 provided to the texture map generation system 400 can be the reconstructed expression information 112 output by expression generation system 200.

The capture data 402 can be input into the identity engine to generate an identity encoding. The identity engine case use machine learning techniques to generate an identification encoding based on an input of one or more images of the person. The generated identification encoding of the respective face of the person can provide an identifier that is invariant to occlusion, pose, lighting and even age, and other factors.

The capture data 402 can be used to generate photogrammetric models 404 of the person. Each image of the frames of video captured from the different cameras may be analyzed to identify features and to generate shapes and textures of the face and head. The data can also be generating using 3D scanning hardware and techniques. The generation of the shapes and textures of the facial features can be done using a process known as photogrammetry. The photogrammetry data 404 can generate the 3D shapes and textures from the combination of the 2D capture data.

The photogrammetry data can be representative of the facial features of the person. Example facial features may include a nose, cheeks, eyes, eyebrows, the forehead, ears, mouth, teeth, and so on. Thus, a facial feature may represent a portion of the real-life person. The locations of the facial features may be defined, in some embodiments, as two- or three-dimensional coordinates. For example, a coordinate reference frame may be defined. Each image and/or frame of capture data may be analyzed to map facial features of a real-life person onto the coordinate reference frame.

As an example, each time slice of data of the motion capture data can be used to generate separate photogrammetric models of the positions of the facial features. This motion capture information may be analyzed to identify features to be input into the texture map generation system 400. The motion capture information may, in some embodiments, allow for rapid importation of locations of facial features on a real-life person. For example, the motion capture information may indicate locations of the person's facial features at discrete times. Each discrete time may be defined as a particular expression of the person. Thus, the location of the facial features may be identified for each expression.

The output of the photogrammetric model(s) 404 can be used to generate a mesh of the person 406. The resulting photogrammetric model is not a perfect representation of the person. The model 404 may still contain gaps and incongruities within the model that need to be cleaned up in order to generate the mesh of the head. The generation of the mesh a results in a collection of vertices, edges and faces that defines the shape of the head. Various processes can be used for generation of the polygon mesh based on the requirements of the specific game application and development environment. The system can additionally track the vertices of the mesh for each of the frames of data that is provided by the capture data. A tracked mesh can then be created based on the motion capture data 402 and the model data

404. The generation of the tracked mesh can also provide for the generation of UV coordinates of the mesh.

The UV coordinates of the 3D model can be used to generate texture maps of the model, such as normal texture maps 408 and diffuse texture maps 410. Other types of texture maps can be generated as well. A diffuse texture map can define the color and pattern of the object. A normal texture map can store the surface normal at each point. In other words, the normal texture map can provide a description of how the geometry is curved. The texture map data can be provided to the texture map generation system 400.

The texture map generation system 400 can utilize deep learning techniques (e.g., convolutional neural networks) to generate one or textures from the input data. The input data may include capture data 402, photogrammetry data 404, mesh data 406, texture map data including normal texture map data 408 and diffuse texture map data 410, range of motion data 412, and one or more outputs from the identity engine 210. This can include a significant amount of data and may include thousands, hundreds of thousands, millions, and so on, samples of these types of data. The texture map generation system 400 can be trained using a supervised and/or semi-supervised learning process. It would be expensive and difficult to generate complete datasets for many thousands or hundreds of thousands of different persons. Accordingly, the system can be configured to generate synthetic training data based on modifications of the generated sets of training data for individual persons.

In some embodiments, the texture map generation system 400 can use a convolutional neural network. A convolutional neural network can consist of an input layer, multiple hidden layers and an output layer. The convolutional neural network is a feed-forward neural network and the middle layers are hidden because their inputs and outputs are masked by the activation function and final convolution. The hidden layers include layers that perform convolutions. This may include one or more layers that does multiplication or other dot product, and its activation function, such as ReLU. The layers may include a plurality of other layers such as pooling layers, fully connected layers, and normalization layers.

The texture map generation system 400 can be trained to find the relationship between the 2D input images 402 and the output mesh 406 and/or textures 408 and 410. The deep learning techniques may be utilized to extract locations of the facial features. For example, the model may be trained to identify specific facial features depicted in an image or video frame. The model can be trained to use the 2D image data and the identity encoding to find the smallest activation vector that can represent expressions for meshes and textures. Adding the identity encoding as an input can help to enforce proper mesh and texture generation. In some instances, the output of the model can sometimes warp in and out to of different faces. The texture map generation system 400 can further use regression training to predict whether the generated meshes and/or textures are representative of expressions of the person, such as a smile or a frown. The movement of the eyes or mouth in capture data may be analyzed to determine relative movement of each of the facial features. This relative movement may be translated to the coordinate reference frame. The texture map generation system 400 may be utilized to extract locations of the facial features on the coordinate reference plane, such as UV coordinates.

In some embodiments, the texture map generation system 400 can uses a source of noise to initialize the training process. The texture map generation system 400 can randomly train with all of the input data at the same time. The end result of the trained model can be to generate texture maps based on the capture data. Examples of the results of the training process are illustrated in FIG. 4B. The examples are of diffuse texture maps and normal texture maps. The input data is representative of the capture data 402 provided to the texture map generation system 400. The ground truth is the representative of the output generated during the process described above for generating texture maps without the use of the texture map generation system 400. The prediction is the output generated by the texture map generation system 400. The texture map generation system 400 can be trained to generate texture maps, such as the illustrated normal and diffuse texture maps, for each frame of input capture data.

FIG. 4C illustrates an example of the application of a trained texture map generation system 400. The input to the texture map generation system 400 can include one or more 2D images 112 of a person and identity information 212 for the person. The 2D images 212 of the person can be generated by the expression generation system 200. The identity information 212 can be generated by the identity engine 210. The 2D images 112 can be a full set of range of motion data that is generated based on one image of the person using expression generation system 200. The embodiment illustrated of the texture map generation system 400 is an example of a CNN. As described herein, the trained CNN can include an input layer, a plurality of hidden layers (e.g., convolutional layers, pooling layers, fully connected layers, etc.), and an output layer. At the input layer, the texture map generation system 400 can receive a 2D image 112 and the identity encoding 212 for the person. Each 2D image/frame of the range of motion information can be processed separately. The model can generate and output at the output layer one or more texture maps 420 for each input 2D image received. The model can determine the relationship between the 2D input images and the output textures. The model can extract locations of the facial features. For example, the model may identify specific facial features depicted in an image or video frame. The model can use the 2D image data and the identity encoding to find the smallest activation vector that can represent expressions for meshes and textures. The model can use the extracted facial features to generate texture maps of the person.

In the illustrated embodiment, the expression generation system 200 outputs a diffuse texture layer and a normal texture layer. In some embodiments, the expression generation system 200 model can be configured to generate and output the texture map outputs 420 in real-time. For example, the texture map generation system 400 can generate the texture maps at the speed at which a video of the range of motion information plays, such as 60 frames per second.

Advantageously, the texture map generation system 400 is a separate and distinct process that can be used in connection with the output generated by expression generation system 200 to create textures associated with an image of a person. As described in association with expression generation system 200, the procession can generate animate of range of motion data for the system based on a single image. As a continuation of the animation process for a specific person, the texture map generation system 400 can be configured to generate the texture maps for the person for each of the images generated for the range of motion animation. In doing this the system can generate a textures that are representative of a defined set of facial positions of facial features of the person based on a single image. This can provide information used for animation of a 3D model of the person.

Example Flowchart/Block Diagrams—Generating Texture Map(s)

Generating texture maps for a person for use within an electronic game is of great importance and can be a time consuming process for electronic game designers. Generating texture maps for realistic expressions may allow for game designers to generate realistic in-game character animation of facial expressions. As will be described, the techniques described herein may allow for rapid generation of 2D texture maps for a defined range of motion for a character based on 2D images of the real-life person. For example, texture maps, such as diffuse and normal texture maps, of a person may generated by the system 400 based on input images of the person.

Figure 5:
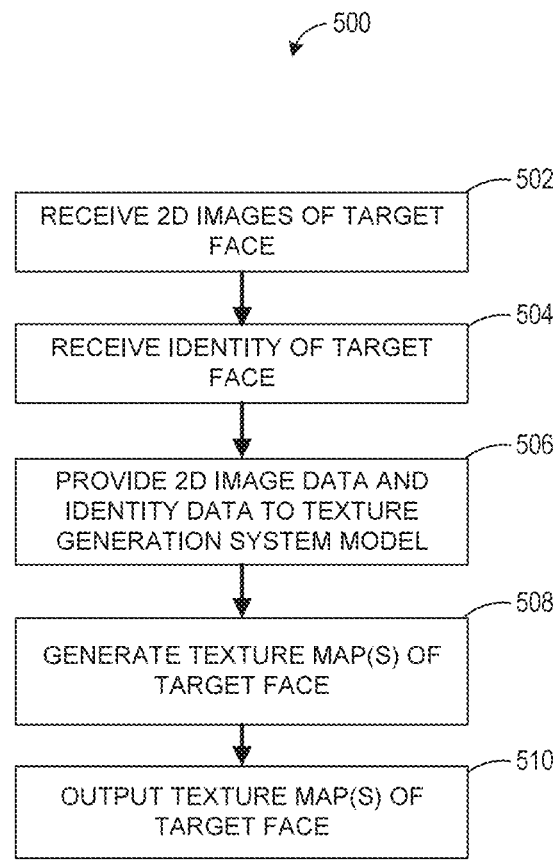
FIG. 5 is a flowchart of an example process for generating output texture maps using the texture map generation system.

FIG. 5 is a flowchart of an example process 500 for generating texture maps of a person. For convenience, the process 500 will be described as being performed by a system of one or more computers (e.g., texture map generation system 400).

At block 502, the system obtains one or more 2D images of a person. The source data may be one or more images and/or video of a real-life first person. In some embodiments, the 2D images may be a defined set of range of motion data synthetically generated by the expression generation system 200. The range of motion data can be based on a single image of the person.

At block 504, the system receives an identity encoding of the person from an identity engine. The identity engine case use machine learning techniques to provide a facial recognition system to generate an identification encoding based on an input of one or more images of the first person. The generated identification encoding of the respective face of the person can provide an identifier that is invariant to occlusion, pose, lighting, age, and other factors.

At block 506, the system can provide the 2D image and the identity encoding for the person to the trained machine learning model. Each 2D image/frame of the range of motion information can be processed separately. The machine learning model can be a CNN.

At block 508, the model can generate one or more texture maps for each input 2D image received. The model can determine the relationship between the 2D input images and the output textures. The model can extract locations of the facial features. For example, the model may identify specific facial features depicted in an image or video frame. The model can use the 2D image data and the identity encoding to find the smallest activation vector that can represent expressions for meshes and textures. The model can use the extracted facial features to generate texture maps of the person. The generated texture maps can include diffuse texture maps and normal texture maps. The model can generate texture maps in real-time. For example, the texture maps can be generated at the rate at which a video plays, such as at 60 frames per second.

At block 510, the system outputs a set of texture maps 2D images of the second person with the expressions included in the source data. The generated output is a set of texture maps of the person. Each frame of the received video of the person can correspond to a texture maps for the person. The output data set are new synthetically generated texture maps that are independent of any preexisting texture data associated with the person.

The system can use the system to create a predefined set of texture maps, such as traditional range of motion (ROM) expressions, which includes a person going through a defined series of facial motions in an attempt to capture all possible muscle activations of the persons face. In which case, the source data can synthetically generate a standard set of texture maps based on the input image of a person.

The generated texture maps may be provided to a game designer for use in further game development processes. For example, the output images can be used in the processes described herein with respect to the automated generation of additional 2D and 3D data associated with the person. The output data can be used as input for additional machine learning based models.

3D Mesh Generation

FIGS. 6A-6D illustrates embodiments of a mesh generation system 600 for generating and outputting a mesh of a face and head of a virtual character. The meshes can be based on a 2D image of a face of a person in conjunction with outputs generated by the expression generation system and texture map generation system 400. The mesh generation system 600 may, in some embodiments, be a system of one or more computers, one or more virtual machines executing on a system of one or more computers, and so on. In some embodiments, the mesh generation system 600 may be implemented as a module, or software (e.g., an application), which may execute on a user device (e.g., a laptop, tablet, console gaming system, and so on).

Figure 6A:
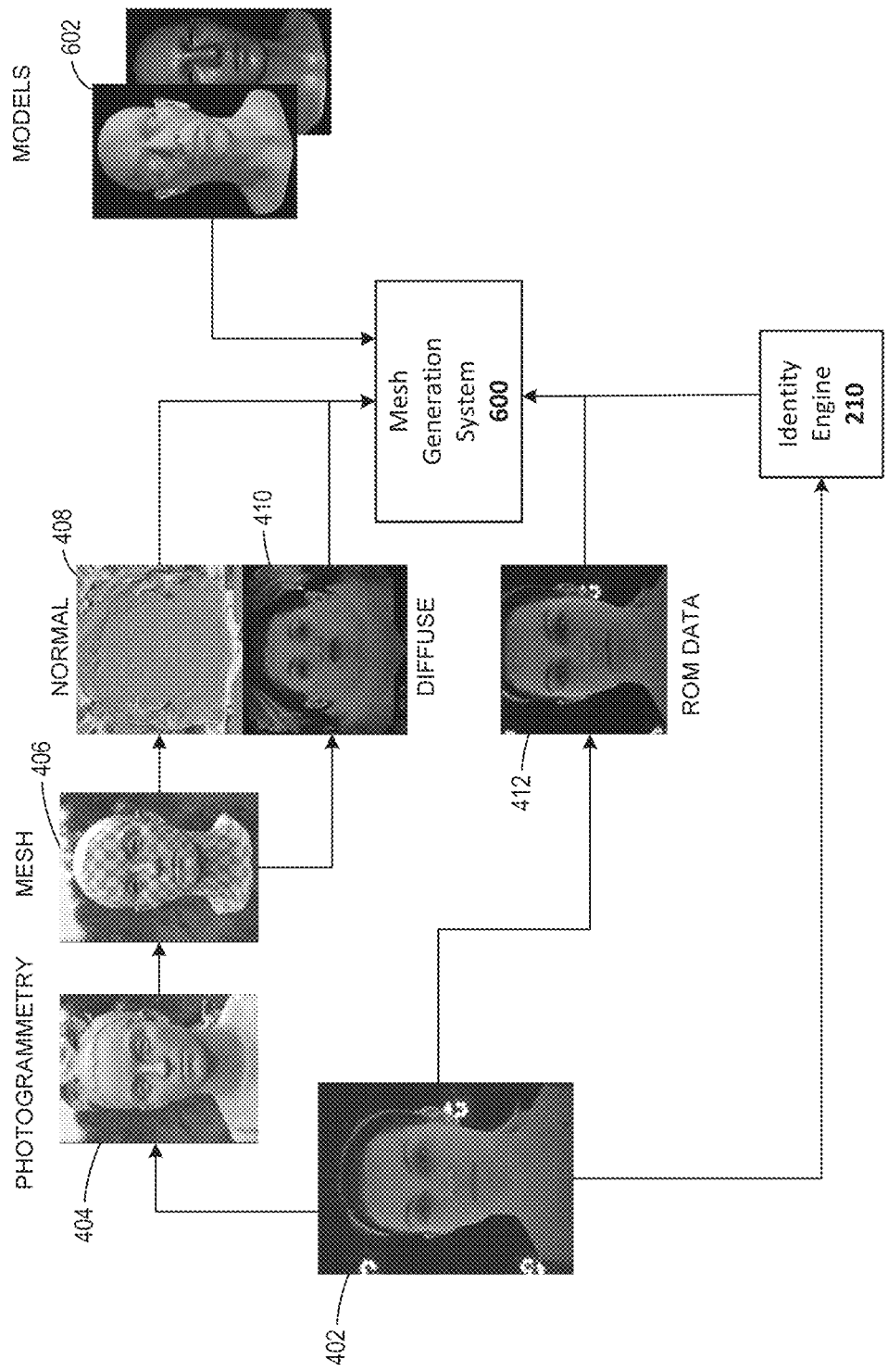
FIG. 6A illustrates a block diagram of an example mesh generation system.

FIG. 6A illustrates a block diagram of exemplary input data used for training a mesh generation system 600. In the illustrated embodiment, the mesh generation system 600 is trained using capture data 402, photogrammetry data 404, mesh data 406, texture map data including normal texture map data 408 and diffuse texture map data 410, range of motion data 412, model data 602, and one or more outputs from the identity engine 210. The set of data is being provided as illustrative of the types of data that can be used for training of a machine learning model. It may be appreciated that thousands, hundreds of thousands, millions, and so on, samples of these types of data may be input to the mesh generation system 600. The training data used to train the mesh generation system 600 can be the same data used to train the texture map generation system 400, which is described in conjunction with FIG. 4A. The input data can also include model databased including a plurality of head models.

In some embodiments, the mesh generation system 600 can use a convolutional neural network. A convolutional neural network can consist of an input layer, multiple hidden layers and an output layer. The convolutional neural network is a feed-forward neural network and the middle layers are hidden because their inputs and outputs are masked by the activation function and final convolution. The hidden layers include layers that perform convolutions. This may include one or more layers that does multiplication or other dot product, and its activation function, such as ReLU. The layers may include a plurality of other layers such as pooling layers, fully connected layers, and normalization layers.

The model database can include a plurality of models that can be analyzed. The models can be analyzed to determine an identity encoding associated with each model. Each of the models can have the facial features analyzed to determine 3D facial features associated with the models and identify facial regions associated with the facial features. The mesh generation system 600 can be trained to find the relationship between the 2D input images 402 and the output mesh 406 and/or textures 408 and 410, and models 602.

In some embodiments, the mesh generation system 600 can be trained to identify one of the models in the model database that is most similar to the identity of the input data identifying a new target face for use with applying the target face to one of the models. The mesh generation system 600 can be configured determine how to conform the texture maps generated for the target face for the model. In some embodiments, identify a set of models that can be used as models for output by the mesh generation system 600 during application of the trained model.

In some embodiments the mesh generation system 600 can analyze the faces of the models in order to break the models into various facial regions associated with the facial features. The mesh generation system 600 can then be trained to generate a facial mesh model by substituting the various facial regions associated with each of the models. In some embodiments, the mesh generation system 600 can be a generative model (e.g., an autoencoder or variational auto encoder) that can be trained to generate a mesh based on learning from models in the database.

Figure 6B:
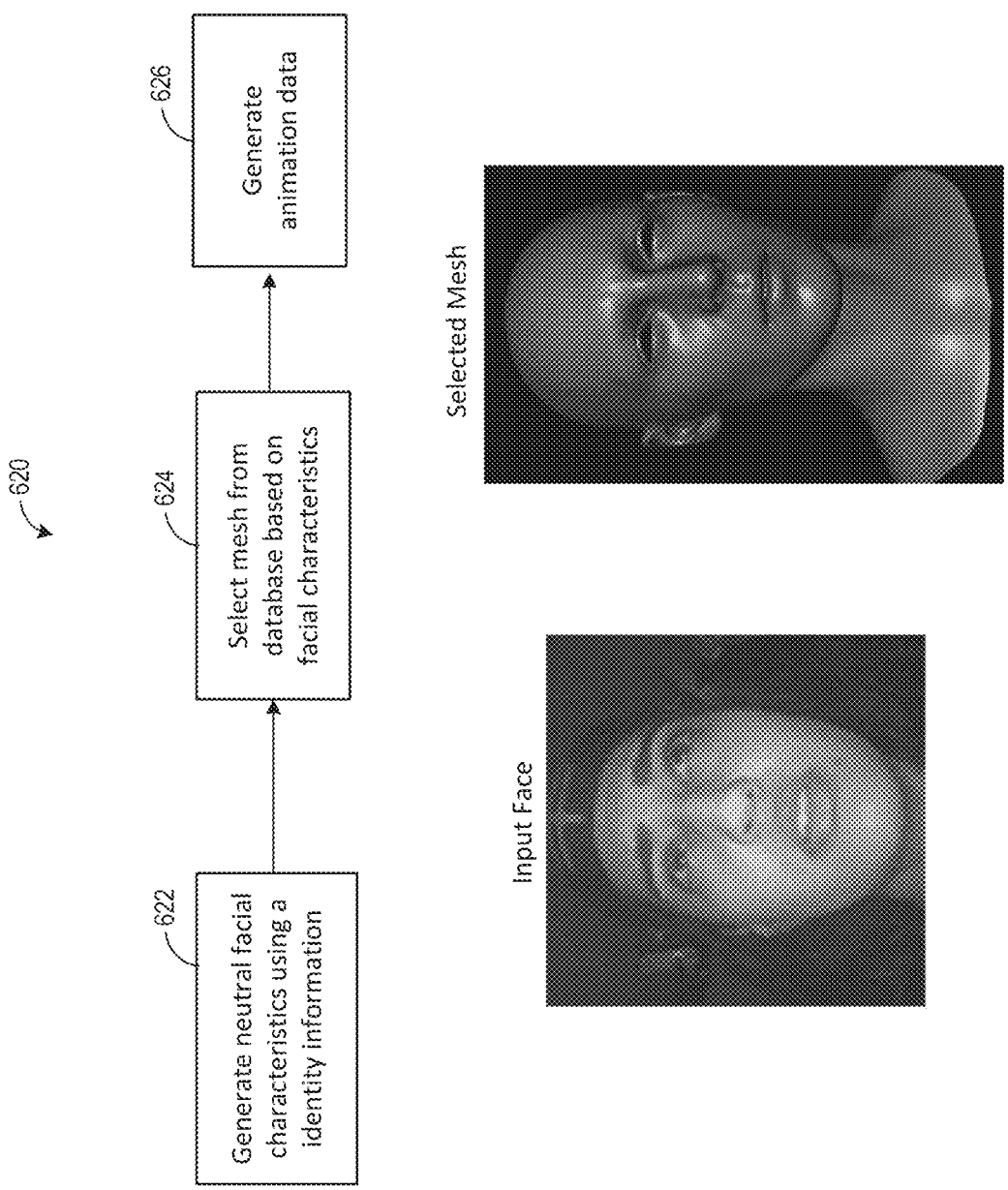
FIG. 6B illustrates an embodiment of training a model to generate a mesh of a character model using the mesh generation system.

FIG. 6B illustrates an embodiment of a process 620 for training a model to generate a mesh 610 of a character model with the mesh generation system 600. At block 622, the mesh generation system 600 uses the identity information to generate neutral facial characteristics of the person's face. In some embodiments, the identity information is solely used to determine the facial characteristics of a person. In some embodiments, the system may use additional information to determine facial characteristics. For example, the range of motion information 112, and/or the texture maps associated with the person may be used.

At block 624, the mesh generation system 600 can use train a generative model to generate a mesh from a database of available meshes based on the facial characteristics of the person. For example, the generative model can be a variational autoencoder. The mesh generation system 600 can be trained to select the model based on a comparison between the facial characteristics of the person and the facial characteristics of each of the meshes within the database. In some embodiments, the selection of the mesh from the database may be based solely on the identity information associated with the person. The selection of the mesh can be the one that is closest to the identity information associated with the mesh.

At block 626, the mesh generation system 600 can be trained to generate animation data for the selected mesh. The mesh generation system 600 can be configured to correlate the facial characteristics of the mesh with the facial characteristics of the of the facial expressions, such as the range of motion data 112 generated by the expression generation system 200. The model can be trained to reconstruct the 2D input expression on the 3D mesh. The expressions may be used as a condition in a generative model, such as a conditional variational autoencoder. Advantageously, once trained, the machine learning model may be used to generate realistic expressions and animations via sampling of a latent feature space. As an example, based on the latent feature space, each of the expressions from the range of motion data may be generated for an animation sequence. Examples of an input face and a selected mesh are illustrated in FIG. 6C.

FIG. 6C illustrates an embodiment of a process 630 for training a model to generate a mesh 610 of a character model with the mesh generation system 600. At block 632, the mesh generation system 600 identifies facial characteristics of the person's face. The analysis of the facial characteristics can be based on an analysis of the identity information 212, the range of motion information 112, and/or the texture maps associated with the person.

Figure 6D:
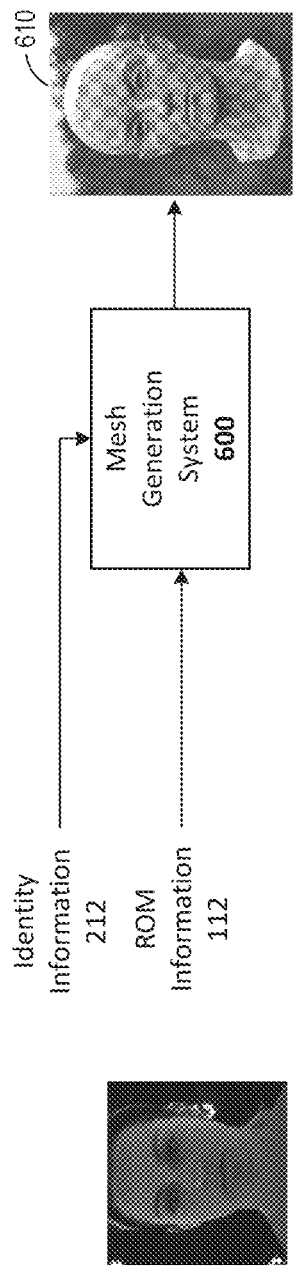
FIG. 6D illustrates example output meshes generated by the example mesh generation system.

At block 634, the mesh generation system 600 identifies regions of the face from one or more meshes based on the facial characteristics. The mesh generation system 600 can continue to swap between meshes until a mesh region is found that best matches the facial characteristics of the face. The system 600 can generate an augmented data set by generating synthetic face data. The synthetic face data can be generated by swapping regions of different face meshes and the face meshes can be rendered with textures. The augmented synthetic data set can be used as training data for generating a mesh generation model. FIG. 6D illustrates an example of regions of the face that are associated with different meshes.

At block 636, during training, the mesh generation system 600 can interpolate between the different facial regions. The use of different facial regions can result in irregularities of the mesh. Interpolation between the regions can clean up the irregularities and result in a seamless transition between regions and a more natural looking face.

At block 638, the mesh generation system 600 can continue to train the model until it can generate a composite mesh based on the interpolated facial regions that matches the identify of a target face. As discussed above, the system can train the model using an augmented set of face data. The augmented data can provide for a large dataset of faces from which to train and refine the model. An example of a composite textured mesh is illustrated in FIG. 6D.

At block 640, the mesh generation system 600 can be trained to generate animation data for the composite mesh. The mesh generation system 600 can be configured to correlate the facial characteristics of the mesh with the facial characteristics of the facial expressions, such as the range of motion data 112 generated by the expression generation system 200. The model can be trained to reconstruct the 2D input expression on the 3D mesh. The expressions may be used as a condition in a generative model, such as a conditional variational autoencoder. Advantageously, once trained, the machine learning model may be used to generate realistic expressions and animations via sampling of a latent feature space. As an example, based on the latent feature space, each of the expressions from the range of motion data may be generated for an animation sequence.

With respect to training the mesh generation system to generate animations of the meshes as described with reference to FIGS. 6B and 6C, the system can train a generative model, such as a variational autoencoder, to generate the animation data for the meshes. The machine learning model may be trained to reconstruct an input expression given one or more previous expressions. For example, the input expression and previous expressions may be obtained from the 2D range of motion data 112 as well as images of a face or from video. In this example, expressions may be used as a condition in a conditional variational autoencoder. Advantageously, once trained the machine learning model may be used to generate realistic animations via sampling of a latent feature space. As an example, a sequence of expressions may be accessed, such as the ROM data 112. Based on the latent feature space, a new expression may be generated for the sequence. Via repeating this technique, for example using autoregressive methods, a multitude of new expressions may be generated for an animation.

It may be appreciated that a learned latent feature space may be used to generate expressions. For example, the latent feature space for a variational autoencoder may be continuous. In this example, the latent variables may be defined as respective distributions with associated mean and variance. To generate an expression, the system may sample these latent variables. For example, the system may select values for these latent variables. This sample may then be provided to the decoder to generate an output expression, for example as a vector associated with the latent feature space. In this way, new expression animations may be generated by the system.

Realistic expression animations may be generated via autoregressive techniques. For example, a particular autoencoder (e.g., a conditional variational autoencoder) may be trained using an input expression and one or more prior expressions as conditions. Thus, the particular autoencoder may be trained to reconstruct the input expression given the one or more prior expressions. Advantageously, once trained the particular autoencoder may be used to generate a sequence of expressions for blending together as animation. As an example, a sequence of expressions may be used to sample a latent feature space generated based on the particular autoencoder. Via sampling the latent feature space, a new expression may be generated. This new expression may be generated such that it is a realistic next expression in the sequence of expressions.

Similarly, in some embodiments a machine learning model may be trained to reconstruct an input expression given labeled positions of portions of an expression (e.g., facial features). For example, the positions may be provided as conditions to a conditional variational autoencoder. In this way, the conditional variational autoencoder may learn to associate positions of facial features with specific expressions. Once trained, an expression may be modified via adjusting positions of facial features. In this way, a user may cause realistic movement of facial features from a neutral expression.

FIG. 6D illustrates an example of the application of a trained mesh generation system 600. The input to the mesh generation system 600 can include one or more 2D images 112 of a person and identity information 212 for the person. The 2D images 212 of the person can be generated by the expression generation system 200. The identity information 212 can be generated by the identity engine 210. The 2D images 112 can be a full set of range of motion data that is generated based on one image of the person using expression generation system 200.

The input of mesh generation system 600 can receive a 2D image 112 and the identity encoding 212 for the person. The mesh generation system 600 can process the inputs together in order to generate the character mesh 610 and expression animations. The model can determine the relationship between the input data and output a mesh 610 of a character model based on the data. The mesh generation system 600 can be trained to use various embodiments for generating the facial mesh 610 of the character, such as the processes that are further described with respect to FIGS. 6B and 6C.

Figure 7:
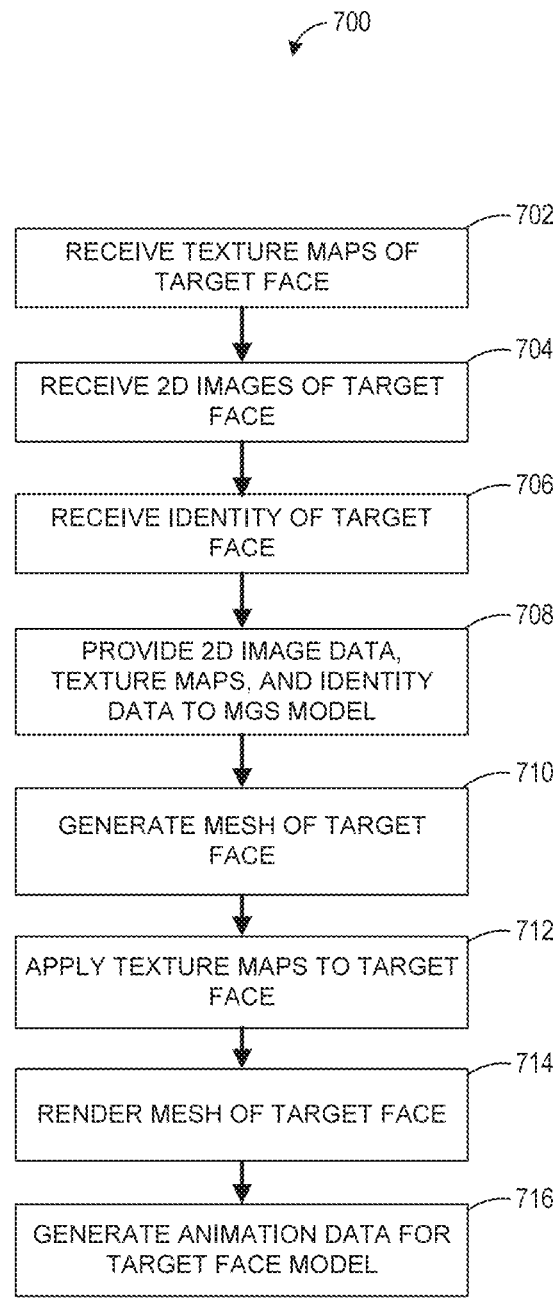
FIG. 7 is a flowchart of an example process for generating meshes using the mesh generation system.

FIG. 7 is a flowchart of an example process 700 for generating meshes and animation data of a person. For convenience, the process 700 will be described as being performed by a system of one or more computers (e.g., mesh generation system 600).

At block 702, the system obtains texture maps of a target face. The texture maps may be synthetically generated by the texture map generation system 400. The texture maps can include diffuse texture maps and normal texture maps.

At block 704, the system obtains one or more 2D images of the target face. The source data may be one or more images and/or video of a real-life first person. In some embodiments, the 2D images may be a defined set of range of motion data synthetically generated by the expression generation system 200. The range of motion data can be based on a single image of the person.

At block 706, the system receives an identity encoding of the target face from an identity engine. The identity engine case use machine learning techniques to provide a facial recognition system to generate an identification encoding based on an input of one or more images of the target face. The generated identification encoding of the target face can provide an identifier that is invariant to occlusion, pose, lighting and even age, and other factors.

At block 708, the system can provide the 2D image and the identity encoding for the target face to the trained machine learning model.

At block 710, the system can generate a mesh of the target face based on the input data. In some embodiments, the mesh for the target face can be selected from a plurality of available facial meshes. In some embodiments, the mesh can be synthetically generated by combining regions of various meshes into a composite mesh.

At block 712, in some embodiments the system can fit the mesh to the required topology and apply the texture map information to the selected mesh. The system can be configured to correlate the facial characteristics of the mesh with the facial characteristics of the texture maps.

At block 714, the system can render the generated mesh of the target face with the applied texture information.

At block 716, the system can use the range of motion data and the generated texture maps to generate animation data for the mesh of the target face. A machine learning model may be trained to reconstruct an input expression given one or more previous expressions. For example, the input expression and previous expressions may be obtained from an animation of a character or from video of a person. In this example, the previous expressions may be used as a condition in a conditional variational autoencoder. Advantageously, once trained the machine learning model may be used to generate realistic animations via sampling of a latent feature space. As an example, a sequence of expressions may be accessed. Based on the latent feature space, a new expression may be generated for the sequence. Via repeating this technique, for example using autoregressive methods, a multitude of new expressions may be generated for an animation.

It may be appreciated that a learned latent feature space may be used to generate expressions. For example, the latent feature space for a variational autoencoder may be continuous. In this example, the latent variables may be defined as respective distributions with associated mean and variance. To generate an expression, the system may sample these latent variables. For example, the system may select values for these latent variables. This sample may then be provided to the decoder to generate an output expression, for example as a vector associated with the latent feature space. In this way, new expression animations may be generated by the system.

Realistic expression animations may be generated via autoregressive techniques. For example, a particular autoencoder (e.g., a conditional variational autoencoder) may be trained using an input expression and one or more prior expressions as conditions. Thus, the particular autoencoder may be trained to reconstruct the input expression given the one or more prior expressions. Advantageously, once trained the particular autoencoder may be used to generate a sequence of expressions for blending together as animation. As an example, a sequence of expressions may be used to sample a latent feature space generated based on the particular autoencoder. Via sampling the latent feature space, a new expression may be generated. This new expression may be generated such that it is a realistic next expression in the sequence of expressions.

Similarly, in some embodiments a machine learning model may be trained to reconstruct an input expression given labeled positions of portions of an expression (e.g., facial features). For example, the positions may be provided as conditions to a conditional variational autoencoder. In this way, the conditional variational autoencoder may learn to associate positions of facial features with specific expressions. Once trained, an expression may be modified via adjusting positions of facial features. In this way, a user may cause realistic movement of facial features from a starting expression.

Computing System

Figure 8:
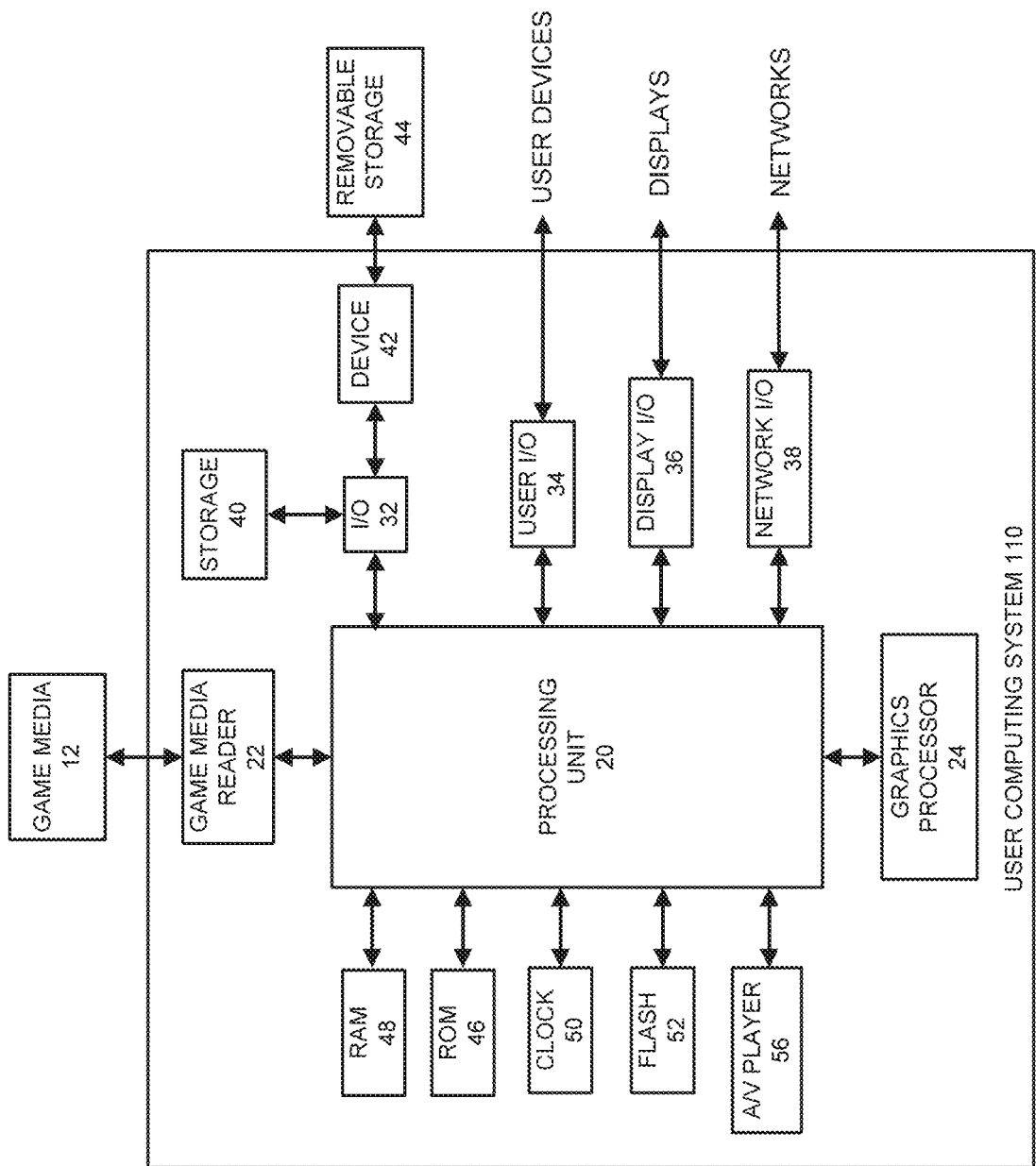
FIG. 8 illustrates an embodiment of computing device according to the present disclosure.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including range of motion (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in range of motion 46, RAM 48 or storage 40 (which might comprise hard disk, other magnetic storage, optical storage, other non-volatile storage or a combination or variation of these). Part of the program code can be stored in range of motion that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, range of motion 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

The following list has example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure:

First Set of Embodiments

1. A computer-implemented method comprising:
   accessing an autoencoder trained based on a plurality of expressions of one or more real-world persons and identity information associated with the real-world persons, each expression being defined based on location information associated with a plurality of facial features, and the identity information, wherein the autoencoder was trained to reconstruct, via a latent variable space, expressions based on the conditional information;
   obtaining, via an interactive user interface, one or more images depicting one or more expressions of a first real-world person and identity information of the first real-world person;
   encoding the one or more expressions in the latent variable space;
   obtaining, via the interactive user interface, an image depicting a second real-world person and identity information of the second real-world person; and
   generating, based on the autoencoder for inclusion in the interactive user interface, at least one image of the second person depicting an expression of the one or more expressions of the first person based on the expression data and the identity data.
2. The computer-implemented method of embodiment 1, wherein the one or more expressions comprises at least a first expression and a second expression, the second expression being subsequent to the first expression in the sequence of expressions, and wherein the at least one image of the second person includes a second image depicting the second expression.
3. The computer-implemented method of embodiment 1, further comprising:
   decoding the latent variable space of the one or more expressions; and
   generating the at least one image based on the decoding.
4. The computer-implemented method of embodiment 1, wherein the expression is blended with the sequence of expressions, and wherein the blending is provided in the interactive user interface as an animation.
5. The computer-implemented method of embodiment 1, wherein the latent variable space is associated with a plurality of latent variables.
6. The computer-implemented method of embodiment 1, wherein each expression is further defined by facial features.
7. The computer-implemented method of embodiment 1, wherein the identity information is generated using a machine learning model.
8. The computer-implemented method of embodiment 7, wherein the identity information comprises an identity vector that is representative of an invariant identity of the respective first or second real-world person.
9. Non-transitory computer storage media storing instructions that when executed by a system of one or more computers, cause the one or more computers to perform operations comprising:
   accessing an autoencoder trained based on a plurality of expressions of one or more real-world persons and identity information associated with the real-world persons, each expression being defined based on location information associated with a plurality of facial features, and the identity information, wherein the autoencoder was trained to reconstruct, via a latent variable space, expressions based on the conditional information;
   obtaining, via an interactive user interface, expression data associated with a first real-world person and identity information of the first real-world person;
   obtaining, via the interactive user interface, an image depicting a second real-world person and identity information of the second real-world person; and
   generating, using the autoencoder for inclusion in the interactive user interface, images of the second person depicting the one or more expressions of the first person based on the expression data and the identity data.
10. The non-transitory computer storage media of embodiment 9, wherein the one or more expressions comprises at least a first expression and a second expression, the second expression being subsequent to the first expression in the sequence of expressions, and wherein the at least one image of the second person includes a second image depicting the second expression.
11. The non-transitory computer storage media of embodiment 9, wherein generating the images comprises:
   decoding the latent variable space of the one or more expressions; and
   generating the at least one image based on the decoding.
12. The non-transitory computer storage media of embodiment 9, wherein the expression is blended with the sequence of expressions, and wherein the blending is provided in the interactive user interface as an animation.
13. The non-transitory computer storage media of embodiment 9, wherein the latent variable space is associated with a plurality of latent variables.
14. The non-transitory computer storage media of embodiment 9, wherein the identity information is generated using a machine learning model and the identity information comprises an identity vector that is representative of an invariant identity of the respective first or second real-world person.
15. A system comprising one or more computers and non-transitory computer storage media storing instructions that when executed by the one or more computers, cause the one or more computers to perform operations comprising:
   accessing an autoencoder trained based on a plurality of expressions of one or more real-world persons and identity information associated with the real-world persons, each expression being defined based on location information associated with a plurality of facial features, and the identity information, wherein the autoencoder was trained to reconstruct, via a latent variable space, expressions based on the conditional information;
   obtaining, via an interactive user interface, expression data associated with a first real-world person and identity information of the first real-world person;
   obtaining, via the interactive user interface, an image depicting a second real-world person and identity information of the second real-world person; and
   generating, using the autoencoder for inclusion in the interactive user interface, images of the second person depicting the one or more expressions of the first person based on the expression data and the identity data.
16. The system of embodiment 15, wherein the one or more expressions comprises at least a first expression and a second expression, the second expression being subsequent to the first expression in the sequence of expressions, and wherein the at least one image of the second person includes a second image depicting the second expression.
17. The system of embodiment 15, wherein the instructions further configure the one or more computers to perform operations comprising:
   decoding the latent variable space of the one or more expressions; and
   generating the at least one image based on the decoding.
18. The system of embodiment 15, wherein the identity information is generated using a machine learning model and the identity information comprises an identity vector that is representative of an invariant identity of the respective first or second real-world person.
19. The system of embodiment 15, wherein the latent variable space is associated with a plurality of latent variables.
20. The system of embodiment 15, wherein the expression is blended with the sequence of expressions, and wherein the blending is provided in the interactive user interface as an animation.

Second Set of Embodiments

1. A computer-implemented method comprising:
   accessing a machine learning model trained based on a plurality of two-dimensional images of one or more real-world persons, three dimensional facial meshes of the one or more real-world persons, two dimensional texture maps for the corresponding facial meshes, and identity information associated with the real-world persons, wherein each of the texture maps is a two dimensional image that maps to the topography of the corresponding three dimensional facial mesh, wherein the machine learning model is trained to generate, via a latent variable space, two-dimensional texture maps based the two-dimensional images of a person;
   obtaining one or more images depicting a face of a first real-world person and identity information of the first real-world person;
   encoding the one or more images in the latent variable space; and
   generating, based on the machine learning model, at least one two dimensional texture map of the first real-world person based on the one or more images and the identity data.
2. The computer-implemented method of embodiment 1, wherein the one or more images of the first real-world person are input as a video, and each of the one or more images is a frame within the video, wherein the video comprises range of motion data for the first real-world person.
3. The computer-implemented method of embodiment 2, wherein generating the at least one two dimensional texture map comprises generating the at least one two dimensional texture map for each frame of the video at substantially the same frame rate as the video.
4. The computer-implemented method of embodiment 1, wherein the at least one two-dimensional texture map comprises a diffuse texture map and a normal texture map.
5. The computer-implemented method of embodiment 1, wherein the identity information is generated using a machine learning model and comprises an identity vector that is representative of an invariant identity of the first real-world person.
6. The computer-implemented method of embodiment 1, wherein the machine learning model is a convolutional neural network.
7. The computer-implemented method of embodiment 1, wherein each face is defined by a plurality of facial features and wherein the machine learning model is configured to extract facial features from the one or more images.
8. The computer-implemented method of embodiment 1, wherein each face is defined by a plurality of facial features and wherein the machine learning model is configured to extract facial features from the one or more images.
9. The computer-implemented method of embodiment 1, wherein the at least one two-dimensional texture map includes UV mapping data for mapping the two-dimensional texture map to a topography of a three-dimensional mesh.
10. Non-transitory computer storage media storing instructions that when executed by a system of one or more computers, cause the one or more computers to perform operations comprising:
    accessing a machine learning model trained based on a plurality of two-dimensional images of one or more real-world persons, three dimensional facial meshes of the one or more real-world persons, two dimensional texture maps for the corresponding facial meshes, and identity information associated with the real-world persons, wherein each of the texture maps is a two dimensional image that maps to the topography of the corresponding three dimensional facial mesh, wherein the machine learning model is trained to generate, via a latent variable space, two-dimensional texture maps based the two-dimensional images of a person;
    obtaining one or more images depicting a face of a first real-world person and identity information of the first real-world person;
    encoding the one or more images in the latent variable space; and
    generating, based on the machine learning model, at least one two dimensional texture map of the first real-world person based on the one or more images and the identity data.
11. The non-transitory computer storage media of embodiment 10, wherein the at least one two-dimensional texture map comprises a diffuse texture map and a normal texture map.
12. The non-transitory computer storage media of embodiment 10, wherein the machine learning model is a convolutional neural network.
13. The non-transitory computer storage media of embodiment 10, wherein each face is defined by a plurality of facial features and wherein the machine learning model is configured to extract facial features from the one or more images.
14. The non-transitory computer storage media of embodiment 10, wherein each face is defined by a plurality of facial features and wherein the machine learning model is configured to extract facial features from the one or more images.
15. The non-transitory computer storage media of embodiment 10, wherein the at least one two-dimensional texture map includes UV mapping data for mapping the two-dimensional texture map to a topography of a three-dimensional mesh.
16. A system comprising one or more computers and non-transitory computer storage media storing instructions that when executed by the one or more computers, cause the one or more computers to perform operations comprising:
    accessing a machine learning model trained based on a plurality of two-dimensional images of one or more real-world persons, three dimensional facial mesh of the one or more real-world persons, two dimensional texture maps for the corresponding facial meshes, and identity information associated with the real-world persons, wherein each of the texture maps is a two dimensional image that maps to the topography of the corresponding three dimensional facial mesh, wherein the machine learning model is trained to generate, via a latent variable space, two-dimensional texture maps based the two-dimensional images of a person;
    obtaining one or more images depicting a face of a first real-world person and identity information of the first real-world person;
    encoding the one or more images in the latent variable space; and generating, based on the machine learning model, at least one two dimensional texture map of the first real-world person based on the one or more images and the identity data.
17. The system of embodiment 16, wherein the at least one two-dimensional texture map comprises a diffuse texture map and a normal texture map.
18. The system of embodiment 16, wherein each face is defined by a plurality of facial features and wherein the machine learning model is configured to extract facial features from the one or more images.
19. The system of embodiment 16, wherein each face is defined by a plurality of facial features and wherein the machine learning model is configured to extract facial features from the one or more images.
20. The system of embodiment 16, wherein the at least one two-dimensional texture map includes UV mapping data for mapping the two-dimensional texture map to a topography of a three-dimensional mesh.

Third Set of Embodiments

1. A computer-implemented method comprising:
   accessing a machine learning model trained based on a plurality of two-dimensional images of one or more real-world persons, three dimensional facial meshes, two dimensional texture maps for the corresponding facial meshes, and identity information associated with the persons and meshes, each mesh defining a three dimensional model of a head of person comprising a plurality of facial features, wherein the machine learning model is trained to generate, via a latent variable space, a three-dimensional mesh;
   obtaining, via an interactive user interface, one or more two-dimensional images depicting a face of a person and identity information of the first person, the face defined by a plurality of facial features;
   encoding, by the machine learning model, the facial features of the first face in the latent variable space;
   generating, by the machine learning model, a first three-dimensional mesh of the first face of the first person in a neutral expression based on the one or more images and the identity data.
2. The computer-implemented method of embodiment 1, wherein the one or more images of the first real-world person are input as a video, and each of the one or more images is a frame within the video, wherein the video comprises range of motion data for the first person, wherein the range of motion data comprises a defined set of expressions of the face.
3. The computer-implemented method of embodiment 2 further comprising, generating, the machine learning model, animation data based on the range of motion data from the video, wherein the animation data comprises positioning facial features of the first three-dimensional mesh in at least each of the defined set of expressions included within the range of motion data.
4. The computer-implemented method of embodiment 3, wherein for individual expressions of the defined set of expressions, the expressions are defined by the positions of the facial features in the expression relative to the positions of the facial features in the neutral expression.
5. The computer-implemented method of embodiment 1, wherein the machine learning model is an autoencoder, the method further comprising:
   decoding, by the autoencoder, the latent variable space of the one or more expressions; and
   generating, by the autoencoder, the first three dimensional mesh based on the decoding.
6. The computer-implemented method of embodiment 5, wherein the autoencoder is a variational autoencoder.
7. The computer-implemented method of embodiment 5, wherein the autoencoder is trained based on generating a composite facial mesh of facial features from a plurality of different facial meshes until an identity vector of the composite mesh matches the identity vector of a target face.
8. The computer-implemented method of embodiment 1, wherein the identity information is generated using a machine learning model, wherein the identity information comprises an identity vector that is representative of an invariant identity of the first face.
9. The computer-implemented method of embodiment 7, wherein the generating the first three-dimensional mesh comprises determining a mesh within a datastore of a plurality of meshes that has an identity vector that is a best match of the identity vector of the first face.
10. The computer-implemented method of embodiment 1, wherein the first face is a synthetically generated face or a face of a real-world person.
11. A system comprising one or more computers and non-transitory computer storage media storing instructions that when executed by the one or more computers, cause the one or more computers to perform operations comprising:
    accessing a machine learning model trained based on a plurality of two-dimensional images of one or more real-world persons, three dimensional facial meshes, two dimensional texture maps for the corresponding facial meshes, and identity information associated with the persons and meshes, each mesh defining a three dimensional model of a head of person comprising a plurality of facial features, wherein the machine learning model is trained to generate, via a latent variable space, a three-dimensional mesh;
    obtaining, via an interactive user interface, one or more two-dimensional images depicting a face of a person and identity information of the first person, the face defined by a plurality of facial features;
    encoding, by the machine learning model, the facial features of the first face in the latent variable space;
    generating, by the machine learning model, a first three-dimensional mesh of the first face of the first person in a neutral expression based on the one or more images and the identity data.
12. The system of embodiment 11, wherein the one or more images of the first real-world person are input as a video, and each of the one or more images is a frame within the video, wherein the video comprises range of motion data for the first person, wherein the range of motion data comprises a defined set of expressions of the face.
13. The system of embodiment 12 further comprising, generating, the machine learning model, animation data based on the range of motion data from the video, wherein the animation data comprises positioning facial features of the first three-dimensional mesh in at least each of the defined set of expressions included within the range of motion data.
14. The system of embodiment 13, wherein for individual expressions of the defined set of expressions, the expressions are defined by the positions of the facial features in the expression relative to the positions of the facial features in the neutral expression.

15. The system of embodiment 11, wherein the machine learning model is an autoencoder, the method further comprising:
    decoding, by the autoencoder, the latent variable space of the one or more expressions; and
    generating, by the autoencoder, the first three dimensional mesh based on the decoding.

16. The system of embodiment 15, wherein the autoencoder is a variational autoencoder.

17. The system of embodiment 15, wherein the autoencoder is trained based on generating a composite facial mesh of facial features from a plurality of different facial meshes until an identity vector of the composite mesh matches the identity vector of a target face.

18. The system of embodiment 11, wherein the identity information is generated using a machine learning model, wherein the identity information comprises an identity vector that is representative of an invariant identity of the first face.

19. The system of embodiment 17, wherein the generating the first three-dimensional mesh comprises determining a mesh within a datastore of a plurality of meshes that has an identity vector that is a best match of the identity vector of the first face.

20. The system of embodiment 11, wherein the first face is a synthetically generated face or a face of a real-world person.

What is claimed is:

1. A computer-implemented method comprising:
accessing a machine learning model trained based on a plurality of two-dimensional images of one or more real-world persons, three-dimensional facial meshes of the one or more real-world persons, two-dimensional texture maps corresponding to the three-dimensional facial meshes, a predefined set of facial expressions, and identity information associated with the real-world persons, wherein each of the texture maps is a two-dimensional image that maps to topography of the corresponding three-dimensional facial mesh, wherein the machine learning model is trained to generate, via a latent variable space, two-dimensional texture maps based on two-dimensional images of a person;
obtaining one or more images depicting a face of a first real-world person and first identity information of the first real-world person;
encoding the one or more images in the latent variable space;
generating a first predefined set of two-dimensional synthetic expressions of the first real-world person based on the one or more images, wherein the first predefined set of two-dimensional synthetic expressions correspond to the predefined set of facial expressions;
generating, using the machine learning model, a first set of two-dimensional texture maps of the first real-world person based on the one or more images and the first identity information, the first set of two-dimensional texture maps including a diffuse texture map and a normal texture map for each expression of the first predefined set of two-dimensional synthetic expressions;
accessing a second machine learning model trained to generate a three-dimensional facial mesh based at least in part on identity information of a real-world person and a corresponding set of two-dimensional texture maps; and generating, by the second machine learning model, a first three-dimensional mesh of the face of the first real-world person based at least in part on the first identity information and the first set of two-dimensional texture maps.

2. The computer-implemented method of claim 1, wherein the one or more images of the first real-world person are input as a video, and each of the one or more images is a frame within the video, wherein the video comprises range of motion data for the first real-world person.

3. The computer-implemented method of claim 1, wherein the identity information is generated using a machine learning model and comprises an identity vector that is representative of an invariant identity of the first real-world person.

4. The computer-implemented method of claim 1, wherein the machine learning model is a convolutional neural network.

5. The computer-implemented method of claim 1, wherein each face is defined by a plurality of facial features and wherein the machine learning model is configured to extract facial features from the one or more images.

6. The computer-implemented method of claim 1 further comprising manipulating the one or more images by performing at least one of scaling, cropping, or converting a color format of the one or more images.

7. The computer-implemented method of claim 1, wherein the first set of two-dimensional texture maps includes UV mapping data for mapping the two-dimensional texture maps to a topography of a three-dimensional mesh.

8. The computer-implemented method of claim 1, wherein generating the first three-dimensional mesh further comprises generating a composite facial mesh of facial features from a plurality of different facial meshes until an identity vector of the composite mesh matches the first identity information.

9. A non-transitory computer storage media storing instructions that when executed by a system of one or more computers, cause the one or more computers to perform operations comprising:
    accessing a machine learning model trained based on a plurality of two-dimensional images of one or more real-world persons, three-dimensional facial meshes of the one or more real-world persons, two-dimensional texture maps corresponding to the three-dimensional facial meshes, a predefined set of facial expressions, and identity information associated with the real-world persons, wherein each of the texture maps is a two-dimensional image that maps to topography of the corresponding three-dimensional facial mesh, wherein the machine learning model is trained to generate, via a latent variable space, two-dimensional texture maps based on two-dimensional images of a person;
    obtaining one or more images depicting a face of a first real-world person and first identity information of the first real-world person;
    encoding the one or more images in the latent variable space;
    generating a first predefined set of two-dimensional synthetic expressions of the first real-world person based on the one or more images, wherein the first predefined set of two-dimensional synthetic expressions correspond to the predefined set of facial expressions;
    generating, using the machine learning model, a first set of two-dimensional texture maps of the first real-world person based on the one or more images and the first identity information, the first set of two-dimensional texture maps including a diffuse texture map and a normal texture map for each expression of the first predefined set of two-dimensional synthetic expressions;

accessing a second machine learning model trained to generate a three-dimensional facial mesh based at least in part on identity information of a real-world person and a corresponding set of two-dimensional texture maps; and generating, by the second machine learning model, a first three-dimensional mesh of the face of the first real-world person based at least in part on the first identity information and the first set of two-dimensional texture maps.

10. The non-transitory computer storage media of claim 9, wherein the machine learning model is a convolutional neural network.

11. The non-transitory computer storage media of claim 9, wherein each face is defined by a plurality of facial features and wherein the machine learning model is configured to extract facial features from the one or more images.

12. The non-transitory computer storage media of claim 9, further comprising manipulating the one or more images by performing at least one of scaling, cropping, or converting a color format of the one or more images.

13. The non-transitory computer storage media of claim 9, wherein the first set of two-dimensional texture maps includes UV mapping data for mapping the two-dimensional texture maps to a topography of a three-dimensional mesh.

14. A system comprising one or more computers and non-transitory computer storage media storing instructions that when executed by the one or more computers, cause the one or more computers to perform operations comprising:

accessing a machine learning model trained based on a plurality of two-dimensional images of one or more real-world persons, three-dimensional facial meshes of the one or more real-world persons, two-dimensional texture maps corresponding to the three-dimensional facial meshes, a predefined set of facial expressions, and identity information associated with the real-world persons, wherein each of the texture maps is a two-dimensional image that maps to topography of the corresponding three-dimensional facial mesh, wherein the machine learning model is trained to generate, via a latent variable space, two-dimensional texture maps based on two-dimensional images of a person;

obtaining one or more images depicting a face of a first real-world person and first identity information of the first real-world person;

encoding the one or more images in the latent variable space;

generating a first predefined set of two-dimensional synthetic expressions of the first real-world person based on the one or more images, wherein the first predefined set of two-dimensional synthetic expressions correspond to the predefined set of facial expressions;

generating, using the machine learning model, a first set of two-dimensional texture maps of the first real-world person based on the one or more images and the first identity information, the first set of two-dimensional texture maps including a diffuse texture map and a normal texture map for each expression of the first predefined set of two-dimensional synthetic expressions;

accessing a second machine learning model trained to generate a three-dimensional facial mesh based at least in part on identity information of a real-world person and a corresponding set of two-dimensional texture maps; and generating, by the second machine learning model, a first three-dimensional mesh of the face of the first real-world person based on at least in part on the first identity information and the first set of two-dimensional texture maps.

15. The system of claim 14, wherein each face is defined by a plurality of facial features and wherein the machine learning model is configured to extract facial features from the one or more images.

16. The system of claim 14, further comprising manipulating the one or more images by performing at least one of scaling, cropping, or converting a color format of the one or more images.

17. The system of claim 14, wherein the first set of two-dimensional texture maps includes UV mapping data for mapping the two-dimensional texture maps to a topography of a three-dimensional mesh.

* * * * *